Patented Jan. 8, 1952

2,581,381

UNITED STATES PATENT OFFICE 2,581,381

ESTERS OF CERTAIN OXYALKYLATED PHENOL-ALDEHYDE RESINS WITH POLYHYDRIC ALCOHOL - POLYBASIC CARBOXY ACID ACYLOXY ACID ESTERS

Melvin De Groote, St. Louis, and Bernhard Keiser, Webster Groves, Mo., assignors to Petrolite Corporation, Ltd., Wilmington, Del., a corporation of Delaware No Drawing. Application December 10, 1948,
Serial No. 64,465

7 Claims. (Cl. 260—20)

The present invention is concerned with certain new chemical products, compounds, or compositions, having useful application in various arts. This invention is a continuation-in-part of our co-pending application, Serial No. 726,217, filed February 3, 1947 and now abandoned. It includes methods or procedures for manufacturing said new products, compounds or compositions, as well as the products, compounds or compositions themselves.

Said new compounds are the resultant of the esterification reaction involving, on the one hand, (a) a polyhydric alcohol radical, (b) a polybasic carboxylic acid radical, and (c) an acyloxy radical containing 8 to 32 carbon atoms derived from a detergent-forming monocarboxy acid having 8 to 32 carbon atoms, at least one polyhydric alcohol radical being ester-linked with a group containing said acyloxy radical and the number of said groups ester-linked with at least one polyhydric alcohol radical being less than the valency of said polyhydric alcohol radical; and on the other hand, is that of certain hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

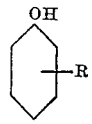

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(R_1O)n$, in which $R_1$ is a member selected form the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

Although the herein described products have a number of industrial applications, they are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in our co-pending application, Serial No. 64,464, filed December 10, 1948 now Patent No. 2,541,999 issued February 20, 1951. See also our co-pending application, Serial No. 64,469, filed December 10, 1948.

The new products are useful as wetting, detergent and levelling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles such as sewage, coal washing waste water, and various trade wastes and the like; as germicides, insecticides, emulsifying agents, as for example, for cosmetics, spray oils, water-repellent textile finishes; as lubricants, etc.

For purpose of convenience what is said hereinafter will be divided into three parts. Part 1 will be concerned with the production of the resin from a difunctional phenol and an aldehyde; Part 2 will be concerned with the oxyalkylation of the resin so as to convert it into a hydrophile hydroxylated derivative; Part 3 will be concerned with the preparation of the acidic reactant which is subsequently combined with the hydroxylated products described in Part 2 immediately preceding;

PART 1

As to the preparation of the phenol-aldehyde resins reference is made to our co-pending applications, Serial Nos. 8,730 and 8,731, both filed February 16, 1948, both of which are now abandoned. In such co-pending applications we described a fusible, organic solvent-soluble, water-insoluble resin polymer of the formula

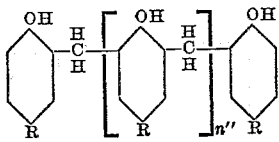

In such idealized representation $n''$ is a numeral varying from 1 to 13 or even more, provided that the resin is fusible and organic solvent-soluble. R is a hydrocarbon radical having at least 4 and not over 8 carbon atoms. In the instant application R may have as many as 12 carbon atoms, as in the case of a resin obtained from a dodecylphenol. In the instant invention it may be first suitable to describe the alkylene oxides employed as reactants, then the aldehydes, and finally the phenols, for the reason that the latter require a more elaborate description.

The alkylene oxides which may be used are the alpha-beta oxides having not more than 4 carbon atoms, to wit, the alpha-beta ethylene oxide, alpha-beta propylene oxide, alpha-beta butylene oxide, glycide, and methylglycide.

Any aldehyde capable of forming a methylol or a substituted methylol group and having not more than 8 carbon atoms is satisfactory, so long as it does not possess some other functional group or structure which will conflict with the resinification reaction or with the subsequent oxyalkylation of the resin, but the use of formaldehyde, in its cheapest form of an aqueous solution, for the production of the resins is particularly advantageous. Solid polymers of formaldehyde are more expensive and higher aldehydes are both less reactive, and are more expensive. Furthermore, the higher aldehydes may undergo other reactions which are not desirable, thus introducing difficulties into the resinification step. Thus acetaldehyde, for example, may undergo an aldol condensation, and it and most of the higher aldehydes enter into self-resinification when treated with strong acids or alkalies. On the other hand, higher aldehydes frequently beneficially affect the solubility and fusibility of a resin. This is illustrated, for example, by the different characteristics of the resin prepared from para-tertiary amylphenol and formaldehyde on one hand, and a comparable product prepared from the same phenolic reactant and heptaldehyde on the other hand. The former, as shown in certain subsequent examples, is a hard, brittle, solid, whereas the latter is soft and tacky, and obviously easier to handle in the subsequent oxyalkylation procedure.

Cyclic aldehydes may be employed, particularly benzaldehyde. The employment of furfural requires careful control for the reason that in addition to its aldehydic function, furfural can form condensations by virtue of its unsaturated structure. The production of resins from furfural for use in preparing products from the present process is most conveniently conducted with weak alkaline catalysts and often with alkali metal carbonates. Useful aldehydes, in addition to formaldehyde, are acetaldehyde, propionic aldehyde, butyraldehyde, 2-ethylhexanal, ethylbutylraldehyde, heptaldehyde, and benzaldehyde, furfural and glyoxal. It would appear that the use of glyoxal should be avoided due to the fact that it is tetrafunctional. However, our experience has been that, in resin manufacture and particularly as described herein, apparently only one of the aldehydic functions enters into the resinification reaction. The inability of the other aldehydic function to enter into the reaction is presumably due to steric hindrance. Needless to say, one can use a mixture of two or more aldehydes although usually this has no advantage.

Resins of the kind which are used as intermediates in this invention are obtained with the use of acid catalysts or alkaline catalysts, or without the use of any catalyst at all. Among the useful alkaline catalysts are ammonia, amines, and quaternary ammonium bases. It is generally accepted that when ammonia and amines are employed as catalysts they enter into the condensation reaction and, in fact, may operate by initial combination with the aldehydic reactant. The compound hexamethylenetetramine illustrates such a combination. In light of these various reactions it becomes difficult to present any formula which would depict the structure of the various resins prior to oxyalkylation. More will be said subsequently as to the difference between the use of an alkaline catalyst and an acid catalyst; even in the use of an alkaline catalyst there is considerable evidence to indicate that the products are not identical where different basic materials are employed. The basic materials employed include not only those previously enumerated but also the hydroxides of the alkali metals, hydroxides of the alkaline earth metals, salts of strong bases and weak acids such as sodium acetate, etc.

Suitable phenolic reactants include the following: Para-tertiarybutylphenol; para-secondary-butylphenol; para-tertiary-amylphenol; para-secondary-amylphenol; para-tertiary-hexylphenol; para-isooctylphenol; ortho-phenylphenol; para-phenylphenol; ortho-benzylphenol; para-benzylphenol; and para-cyclohexylphenol, and the corresponding ortho-para substituted meta-cresols and 3,5-xylenols. Similarly, one may use para- or ortho-nonylphenol or a mixture, para- or decylphenol or a mixture, methylphenol, or para- or ortho-dodecylphenol.

The phenols herein contemplated for reaction may be indicated by the following formula:

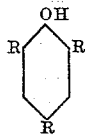

in which R is selected from the class consisting of hydrogen atoms and hydrocarbon radicals having at least 4 carbon atoms and not more than 12 carbon atoms, with the proviso that one occurrence of R is the hydrocarbon substituent and the other two occurrences are hydrogen atoms, and with the further provision that one or both of the 3 and 5 positions may be methyl substituted.

The above formula possibly can be restated more conveniently in the following manner, to wit, that the phenol employed is of the following formula, with the proviso that R is a hydrocarbon substituent located in the 2,4,6 position, again with the provision as to 3 or 3,5 methyl substitution. This is conventional nomenclature, numbering the various positions in the usual clockwise manner, beginning with the hydroxyl position as one:

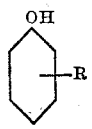

The manufacture of thermoplastic phenol-aldehyde resins, particularly from formaldehyde and a difunctional phenol, i. e., a phenol in which one of the three reactive positions (2,4,6) has been substituted by a hydrocarbon group, and particularly by one having at least 4 carbon atoms and not more than 12 carbon atoms, is well known. As has been previously pointed out, there is no objection to a methyl radical provided it is present in the 3 or 5 position.

These resins, used as intermediates to produce the products of the present invention are described in detail in our Patent 2,499,370, granted March 7, 1950, and specified examples of suitable resins are those of Examples 1a through 103a of that patent, and reference is made thereto for a description of these intermediate resins and for examples thereof.

PART 2

Having obtained a suitable resin of the kind described, such resin is subjected to treatment with a low molal reactive alpha-beta olefin oxide so as to render the product distinctly hydrophile in nature as indicated by the fact that it becomes self-emulsifiable or miscible or soluble in water, or self-dispersible, or has emulsifying properties. The olefin oxides employed are characterized by the fact that they contain not over 4 carbon atoms and are selected from the class consisting of ethylene oxide, propylene oxide, butylene oxide, glycide, and methylglycide. Glycide may be, of course, considered as a hydroxy propylene oxide and methyl glycide as a hydroxy butylene oxide. In any event, however, all such reactants contain the reactive ethylene oxide ring and may be best considered as derivatives of or substituted ethylene oxides. The solubilizing effect of the oxide is directly proportional to the percentage of oxygen present, or specifically, to the oxygen-carbon ratio.

In ethylene oxide, the oxygen-carbon ratio is 1:2. In glycide, it is 2:3; and in methyl glycide, 1:2. In such compounds, the ratio is very favorable to the production of hydrophile or surface-active properties. However, the ratio, in propylene oxide, is 1:3, and in butylene oxide, 1:4. Obviously, such latter two reactants are satisfactorily employed only where the resin composition is such as to make incorporation of the desired property practical. In other cases, they may produce marginally satisfactory derivatives, or even unsatisfactory derivatives. They are usable in conjunction with the three more favorable alkylene oxides in all cases. For instance, after one or several propylene oxide or butylene oxide molecules have been attached to the resin molecule, oxyalkylation may be satisfactorily continued using the more favorable members of the class, to produce the desired hydrophile product. Used alone, these two reagents may in some cases fail to produce sufficiently hydrophile derivatives because of their relatively low oxygen-carbon ratios.

Thus, ethylene oxide is much more effective than propylene oxide, and propylene oxide is more effective than butylene oxide. Hydroxy propylene oxide (glycide) is more effective than propylene oxide. Similarly, hydroxy butylene oxide (methyl glycide) is more effective than butylene oxide. Since ethylene oxide is the cheapest alkylene oxide available and is reactive, its use is definitely advantageous, and especially in light of its high oxygen content. Propylene oxide is less reactive than ethylene oxide, and butylene oxide is definitely less reactive than propylene oxide. On the other hand, glycide may react with almost explosive violence and must be handled with extreme care.

The oxyalkylation of resins of the kind from which the initial reactants used in the practice of the present invention are prepared is advantageously catalyzed by the presence of an alkali. Useful alkaline catalysts include soaps, sodium acetate, sodium hydroxide, sodium methylate, caustic potash, etc. The amount of alkaline catalyst usually is between 0.2% to 2%. The temperature employed may vary from room temperature to as high as 200° C. The reaction may be conducted with or without pressure, i. e., from zero pressure to approximately 200 or even 300 pounds' gauge pressure (pounds per square inch). In a general way, the method employed is substantially the same procedure as used for oxyalkylation of other organic materials having reactive phenolic groups.

It may be necessary to allow for the acidity of a resin in determining the amount of alkaline catalyst to be added in oxyalkylation. For instance, if a nonvolatile strong acid such as sulfuric acid is used to catalyze the resinification reaction, presumably after being converted into a sulfonic acid, it may be necessary and is usually advantageous to add an amount of alkali equal stoichiometrically to such acidity, and include added alkali over and above this amount as the alkaline catalyst.

It is advantageous to conduct the oxyethylation in presence of an inert solvent such as xylene, cymene, decalin, ethylene glycol diethylether, diethyleneglycol diethylether, or the like, although with many resins, the oxyalkylation proceeds satisfactorily without a solvent. Since xylene is cheap and may be permitted to be present in the final product used as a demulsifier, it is our preference to use xylene. This is particularly true in the manufacture of products from low-stage resins, i. e., of 3 and up to and including 7 units per molecule.

If a xylene solution is used in an autoclave as hereinafter indicated, the pressure readings of course represent total pressure, that is, the combined pressure due to xylene and also due to ethylene oxide or whatever other oxyalkylating agent is used. Under such circumstances it may be necessary at times to use substantial pressures to obtain effective results, for instance, pressures up to 300 pounds along with correspondingly high temperatures, if required.

However, even in the instance of high-melting resins, a solvent such as xylene can be eliminated in either one of two ways: After the introduction of approximately 2 or 3 moles of ethylene oxide, for example, per phenolic nucleus, there is a definite drop in the hardness and melting point of the resin. At this stage, if xylene or a similar solvent has been added, it can be eliminated by distillation (vacuum distillation if desired) and the subsequent intermediate, being comparatively soft and solvent-free, can be reacted further in the usual manner with ethylene oxide or some other suitable reactant.

Another procedure is to continue the reaction to completion with such solvent present and then eliminate the solvent by distillation in the customary manner.

Another suitable procedure is to use propylene oxide or butylene oxide as a solvent as well as a reactant in the earlier stages along with ethylene oxide, for instance, by dissolving the powdered resin in propylene oxide even though oxyalkylation is taking place to a greater or lesser degree. After a solution has been obtained which represents the original resin dissolved in propylene oxide or butylene oxide, or a mixture which includes the oxyalkylated product, ethylene oxide is added to react with the liquid mass until hydrophile properties are obtained. Since ethylene oxide is more reactive than propylene oxide or butylene oxide, the final product may contain some unreacted propylene oxide or butylene oxide which can be eliminated by volatilization or distillation in any suitable manner.

Attention is directed to the fact that the resins herein described must be fusible or soluble in an organic solvent. Fusible resins invariably are soluble in one or more organic solvents such as those mentioned elsewhere herein. It is to be emphasized, however, that the organic solvent employed to indicate or assure that the resin meets this requirement need not be the one used in oxyalkylation. Indeed, solvents which are susceptible to oxyalkylation are included in this group of organic solvents. Examples of such solvents are alcohols and alcohol-ethers. However, where a resin is soluble in an organic solvent, there are usually available other organic solvents which are not susceptible to oxyalkylation, useful for the oxyalkylation step. In any event, the organic solvent-soluble resin can be finely powdered, for instance to 100 to 200 mesh, and a slurry or suspension prepared in xylene or the like, and subjected to oxyalkylation. The fact that the resin is soluble in an organic solvent or the fact that it is fusible means that it consists of separate molecules. Phenol-aldehyde resins of the type herein specified possess reactive hydroxyl groups and are oxyalkylation susceptible.

Considerable of what is said immediately hereinafter is concerned with ability to vary the hydrophile properties of the hydroxylated intermediate reactants from minimum hydrophile properties to maximum hydrophile properties. Such properties in turn, of course, are effected subsequently by the acid employed for esterification and the quantitative nature of the esterification itself, i. e., whether it is total or partial. It may be well, however, to point out what has been said elsewhere in regard to the hydroxylated intermediate reactants. See, for example, our co-pending applications, Serial Nos. 8,730 and 8,731, both filed February 16, 1948, and Serial No. 42,133, filed August 2, 1948, and Serial No. 42,134, filed August 2, 1948 all four of which are now abandoned. The reason is that the esterification, depending on the acid selected, may vary the hydrophile-hydrophobe balance in one direction or the other, and also invariably causes the development of some property which makes it inherently different from the two reactants from which the derivative ester is obtained.

Referring to the hydrophile hydroxylated intermediates, even more remarkable and equally difficult to explain, are the versatility and the utility of these compounds considered as chemical reactants as one goes from minimum hydrophile property to ultimate maximum hydrophile property. For instance, minimum hydrophile property may be described roughly as the point where two ethyleneoxy radicals or moderately in excess thereof are introduced per phenolic hydroxyl. Such minimum hydrophile property or sub-surface-activity or minimum surface-activity means that the product shows at least emulsifying properties or self-dispersion in cold or even in warm distilled water (15° to 40° C.) in concentrations of 0.5% to 5.0%. These materials are generally more soluble in cold water than warm water, and may even be very insoluble in boiling water. Moderately high temperatures aid in reducing the viscosity of the solute under examination. Sometimes if one continues to shake a hot solution, even though cloudy or containing an insoluble phase, one finds that solution takes place to give a homogeneous phase as the mixture cools. Such self-dispersion tests are conducted in the absence of an insoluble solvent.

When the hydrophile-hydrophobe balance is above the indicated minimum (2 moles of ethylene oxide per phenolic nucleus or the equivalent) but insufficient to give a sol as described immediately preceding, then, and in that event hydrophile properties are indicated by the fact that one can produce an emulsion by having present 10% to 50% of an inert solvent such as xylene. All that one need to do is to have a xylene solution within the range of 50 to 90 parts by weight of oxyalkylated derivatives and 50 to 10 parts by weight of xylene and mix such solution with one, two or three times its volume of distilled water and shake vigorously so as to obtain an emulsion which may be of the oil-in-water type or the water-in-oil type (usually the former) but, in any event, is due to the hydrophile-hydrophobe balance of the oxyalkylated derivative. We prefer simply to use the xylene diluted derivatives, which are described elsewhere, for this test rather than evaporate the solvent and employ any more elaborate tests, if the solubility is not sufficient to permit the simple sol test in water previously noted.

If the product is not readily water soluble it may be dissolved in ethyl or methyl alcohol, ethylene glycol diethylether, or diethylene glycol diethylether, with a little acetone added if required, making a rather concentrated solution, for instance 40% to 50%, and then adding enough of the concentrated alcoholic or equivalent solution to give the previously suggested 0.5% to 5.0% strength solution. If the product is self-dispersing (i. e., if the oxyalkylated product is a liquid or a liquid solution self-emulsifiable), such sol or dispersion is referred to as at least semi-stable in the sense that sols, emulsions, or dispersions prepared are relatively stable, if they remain at least for some period of time, for instance 30 minutes to two hours, before showing any marked separation. Such tests are conducted at room temperature (22° C.). Needless to say, a test can be made in presence of an insoluble solvent such as 5% to 15% of xylene, as noted in previous examples. If such mixture, i. e., containing a water-insoluble solvent, is at least semi-stable, obviously the solvent-free product would be even more so. Surface-activity representing an advanced hydrophile-hydrophobe balance can also be determined by the use of conventional measurements hereinafter described. One outstanding characteristic property indicating surface-activity in a material is the ability to form a permanent foam in dilute aqueous solution, for example, less than 0.5%, when in the higher oxyalkylated stage, and to form an emulsion in the lower and intermediate stages of oxyalkylation.

Allowance must be made for the presence of a solvent in the final product in relation to the hydrophile properties of the final product. The principle involved in the manufacture of the herein contemplated compounds for use as polyhydric reactants is based on the conversion of a hydrophobe or non-hydrophile compound or mixture of compounds into products which are distinctly hydrophile, at least to the extent that they have emulsifying properties or are self-emulsifying; that is, when shaken with water they produce stable or semi-stable suspensions, or, in the presence of a water-insoluble solvent, such as xylene, an emulsion. In demulsification, it is sometimes preferable to use a product having markedly enhanced hydrophile properties over and above the initial stage of self-emulsifiability, although we have found that with products of the type used herein, most efficacious results are obtained with products which do not have hydrophile properties beyond the stage of self-dispersibility.

More highly oxyalkylated resins give colloidal solutions or sols which show typical properties comparable to ordinary surface-active agents. Such conventional surface-activity may be measured by determining the surface tension and the interfacial tension against paraffin oil or the like. At the initial and lower stages of oxyalkylation, surface-activity is not suitably determined in this same manner but one may employ an emulsification test. Emulsions come into existence as a rule through the presence of a surface-active emulsifying agent. Some surface-active emulsifying agents such as mahogany soap may produce a water-in-oil emulsion or an oil-in-water emulsion depending upon the ratio of the two phases, degree of agitation, concentration of emulsifying agent, etc.

The same is true in regard to the oxyalkylated resins herein specified, particularly in the lower stage of oxyalkylation, the so-called "sub-surface-active" stage. The surface-active properties are readily demonstrated by producing a xylene-water emulsion. A suitable procedure is as follows: The oxyalkylated resin is dissolved in an equal weight of xylene. Such 50-50 solution is then mixed with 1-3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type) particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaking and further dilution with water.

If in doubt as to this property, comparison with a resin obtained from para-tertiary butylphenol and formaldehyde (ratio 1 part phenol to 1.1 formaldehyde) using an acid catalyst and then followed by oxyalkylation using 2 moles of ethylene oxide for each phenolic hydroxyl, is helpful. Such resin prior to oxyalkylation has a molecular weight indicating about 4½ units per resin molecule. Such resin, when diluted with an equal weight of xylene, will serve to illustrate the above emulsification test.

In a few instances, the resin may not be sufficiently soluble in xylene alone but may require the addition of some ethylene glycol diethylether as described elsewhere. It is understood that such mixture, or any other similar mixture, is considered the equivalent of xylene for the purpose of this test.

In many cases, there is no doubt as to the presence or absence of hydrophile or surface-active characteristics in the polyhydric reactants used in accordance with this invention. They dissolve or disperse in water; and such dispersions foam readily. With borderline cases, i. e., those which show only incipient hydrophile or surface-active property (sub-surface-activity) tests for emulsifying properties or self-dispersibility are useful. The fact that a reagent is capable of producing a dispersion in water is proof that it is distinctly hydrophile. In doubtful cases, comparison can be made with the butylphenol-formaldehyde resin analog wherein 2 moles of ethylene oxide have been introduced for each phenolic nucleus.

The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in presence of added water-insoluble solvent and minor proportions of common eletrolytes as occur in oil field brines.

Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion.

In light of what has been said previously in regard to the variation of range of hydrophile properties, and also in light of what has been said as to the variation in the effectiveness of various alkylene oxides, and most particularly of all ethylene oxide, to introduce hydrophile character, it becomes obvious that there is a wide variation in the amount of alkylene oxide employed, as long as it is at least 2 moles per phenolic nucleous, for producing products useful for the practice of this invention. Another variation is the molecular size of the resin chain resulting from reaction between the difunctional phenol and the aldehyde such as formaldehyde. It is well known that the size and nature or structure of the resin polymer obtained varies somewhat with the conditions of reaction, the proportions of reactants, the nature of the catalyst, etc.

Based on molecular weight determinations, most of the resins prepared as herein described, particularly in the absence of a secondary heating step, contain 3 to 6 or 7 phenolic nuclei with approximately 4½ or 5½ nuclei as an average. More drastic conditions of resinification yield resins of greater chain length. Such more intensive resinification is a conventional procedure and may be employed if desired. Molecular weight, of course, is measured by any suitable procedure, particularly by cryoscopic methods; but using the same reactants and using more drastic conditions of resinification one usually finds that higher molecular weights are indicated by higher melting points of the resins and a tendency to decreased solubility. See what has been said elsewhere herein in regard to a secondary step involving the heating of a resin with or without the use of vacuum.

We have previously pointed out that either an alkaline or acid catalyst is advantageously used in preparing the resin. A combination of castalysts is sometimes used in two stages; for instance, an alkaline catalyst is sometimes employed in a first stage, followed by neutralization and adidtion of a small amount of acid catalyst in a second stage. It is generally believed that even in the presence of an alkaline catalyst, the number of moles of aldehyde, such as formaldehyde, must be greater than the moles of phenol employed in order to introduce methylol groups in the intermediate stage. There is no indication that such groups appear in the final resin if prepared by the use of an acid catalyst. It is possible that such groups may appear in the finished resins prepared solely with an alkaline catalyst; but we have never been able to confirm this fact in an examination of a large number of resins prepared by ourselves. Our preference, however, is to use an acid-catalyzed resin, particularly employing a formaldehyde-to-phenol ratio of 0.95 to 1.20 and, as far as we have been able to determine, such resins are free from methylol groups. As a matter of fact, it is probable that in acid-catalyzed resinifications, the methylol structure may appear only momentarily at the very beginning of the reaction and in all probability is converted at once into a more complex structure during the intermediate stage.

One procedure which can be employed in the use of a new resin to prepare polyhydric reactants for use in the preparation of compounds employed in the present invention, is to determine the hydroxyl value by the Verley-Bölsing method or its equivalent. The resin as such, or in the form of a solution as described, is then treated with ethylene oxide in presence of 0.5% to 2% of sodium methylate as a catalyst in stepwise fashion. The conditions of reaction, as far as time or per cent are concerned, are within the range previously indicated. With suitable agitation the ethylene oxide, if added in molecular proportion, combines within a comparatively short time, for instance a few minutes to 2 to 6 hours, but in some instances requires as much as 8 to 24 hours. A useful temperature range is from 125° to 225° C. The completion of the reaction of each addition of ethylene oxide in step-wise fashion is usually indicated by the reduction or elimination of pressure. An amount conveniently used for each addition is generally equivalent to a mole or two moles of ethylene oxide per hydroxyl radical. When the amount of ethylene oxide added is equivalent to approximately 50% by weight of the original resin, a sample is tested for incipient hydrophile properties by simply shaking up in water as is, or after the elimination of the solvent if a solvent is present. The amount of ethylene oxide used to obtain a useful defulsifying agent as a rule varies from 70% by weight of the original resin to as much as five or six times the weight of the original resin. In the case of a resin derived from para-tertiary butylphenol, as little as 50% by weight of ethylene oxide may give suitable solubility. With propylene oxide, even a greater molecular proportion is required and sometimes a resultant of only limited hydrophile properties is obtainable. The same is true to even a greater extent with butylene oxide. The hydroxylated alkylene oxides are more effective in solubilizing properties than the comparable compounds in which no hydroxyl is present.

Attention is directed to the fact that in the subsequent examples reference is made to the stepwise addition of the alkylene oxide, such as ethylene oxide. It is understood, of course, there is no objection to the continuous addition of alkylene oxide until the desired stage of reaction is reached. In fact, there may be less of a hazard involved and it is often advantageous to add the alkylene oxide slowly in a continuous stream and in such amount as to avoid exceeding the higher pressures noted in the various examples or elsewhere.

It may be well to emphasize the fact that when resins are produced from difunctional phenols and some of the higher aliphatic aldehydes, such as acetaldehyde, the resultant is a comparatively soft or pitch-like resin at ordinary temperatures. Such resins become comparatively fluid at 110° to 165° C. as a rule, and thus can be readily oxyalkylated, preferably oxyethylated, without the use of a solvent.

What has been said previously is not intended to suggest that any experimentation is necessary to determine the degree of oxyalkylation, and particularly oxyethylation. What has been said previously is submitted primarily to emphasize the fact that these remarkable oxyalkylated resins having surface activity show unusual properties as the hydrophile character varies from a minimum to an ultimate maximum. One should not underestimate the utility of any of these polyhydric alcohols in a surface-active or sub-surface-active range without examining them by reaction with a number of the typical esters herein described and subsequently examining the resultant for utility, either in demulsification or in some other art or industry as referred to elsewhere, or as a reactant for the manufacture of more complicated derivatives. A few simple laboratory tests which can be conducted in a routine manner will usually give all the information that is required.

For instance, a simple rule to follow is to prepare a resin having at least three phenolic nuclei and being organic solvent-soluble. Oxyethylate such resin, using the following four ratios of moles of ethylene oxide per phenolic unit equivalent: 2 to 1; 6 to 1; 10 to 1; and 15 to 1. From a sample of each product remove any solvent that may be present, such as xylene. Prepare 0.5% and 5.0% solutions in distilled water, as previously indicated. A mere examination of such series will generally reveal an approximate range of minimum hydrophile character, moderate hydrophile character, and maximum hydrophile character. If the 2 to 1 ratio does not show minimum hydrophile character by test of the solvent-free product, then one should test its capacity to form an emulsion when admixed with xylene or other insoluble solvent. If neither test shows the required minimum hydrophile property, repetition using 2½ to 4 moles per phenolic nucleus will serve. Moderate hydrophile character should be shown by either the 6 to 1 or 10 to 1 ratio. Such moderate hydrophile character is indicated by the fact that the sol in distilled water within the previously mentioned concentration range is a permanent translucent sol when viewed in a comparatively thin layer, for instance the depth of a test tube. Ultimate hydrophile character is usually shown at the 15 to 1 ratio test in that adding a small amount of an insoluble solvent, for instance 5% of xylene, yields a product which will give, at least temporarily, a transparent or translucent sol of the kind just described. The formation of a permanent foam, when a 0.5% to 5.0% aqueous solution is shaken, is an excellent test for surface activity. Previous reference has been made to the fact that other oxyalkylating agents may require the use of increased amounts of alkylene oxide. However, if one does not even care to go to the trouble of calculating molecular weights, one can simply arbitrarily prepare compounds containing ethylene oxide equivalent to about 50% to 75% by weight, for example 65% by weight, of the resin to be oxyethylated; a second example using approximately 200% to 300% by weight, and a third example using about 500% to 700% by weight, to explore the range of hydrophile-hydrophobe balance.

A practical examination of the factor of oxyalkylation level can be made by a very simple test using a pilot plant autoclave having a capacity of about 10 to 15 gallons as hereinafter described. Such laboratory-prepared routine compounds can then be tested for solubility and, generally speaking, this is all that is required to give a suitable variety covering the hydrophile-hydrophobe range. All these tests, as stated, are intended to be routine tests and nothing more. They are intended to teach a person, even though unskilled in oxyethylation or oxyalkylation, how to prepare in a perfectly arbitrary manner, a series of compounds illustrating the hydrophile-hydrophobe range.

If one purchases a thermoplastic or fusible resin on the open market selected from a suitable number which are available, one might have to make certain determinations in order to make the quickest approach to the appropriate oxyalkylation range. For instance, one should know (a) the molecular size, indicating the number of phenolic units; (b) the nature of the aldehydic residue, which is usually $CH_2$; and (c) the nature of the substituent, which is usually butyl, amyl, or phenyl. With such information one is in substantially the same position as if one had personally made the resin prior to oxyethylation.

For instance, the molecular weight of the internal structural units of the resin of the following over-simplified formula:

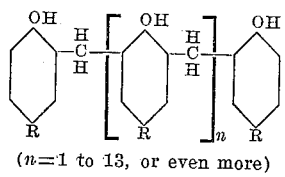

($n=1$ to 13, or even more)

is given approximately by the formula: (Mol. wt. of phenol $-2$) plus mol. wt. of methylene or substituted methylene radical. The molecular weight of the resin would be $n$ times the value for the internal limit plus the values for the terminal units. The left-hand terminal unit of the above structural formula, it will be seen, is identical with the recurring internal unit except that it has one extra hydrogen. The right-hand terminal unit lacks the methylene bridge element. Using one internal unit of a resin as the basic element, a resin's molecular weight is given approximately by taking ($n$ plus 2) times the weight of the internal element. Where the resin molecule has only 3 phenolic nuclei as in the structure shown, this calculation will be in error by several per cent; but as it grows larger, to contain 6, 9, or 12 phenolic nuclei, the formula comes to be more than satisfactory. Using such an approximate weight, one need only introduce, for example, two molal weights of ethylene oxide or slightly more, per phenolic nucleus, to produce a product of minimal hydrophile character. Further oxyalkylation gives enhanced hydrophile character. Although we have prepared and tested a large number of oxyethylated products of the type described herein, we have found no instance where the use of less than 2 moles of ethylene oxide per phenolic nucleus gave desirable products.

Examples 1$b$ through 18$b$ and the tables which appear in columns 51 through 56 of our said Patent 2,499,370 illustrate oxyalkylation products from resins which are useful as intermediates for producing the esterified products of the present invention, such examples giving exact and complete details for carrying out the oxyalkylation procedure.

The resins, prior to oxyalkylation, vary from tacky, viscous liquids to hard, high-melting solids. Their color varies from a light yellow through amber, to a deep red or even almost black. In the manufacture of resins, particularly hard resins, as the reaction progresses the reaction mass frequently goes through a liquid state to a sub-resinous or semi-resinous state, often characterized by being tacky or sticky, to a final complete resin. As the resin is subjected to oxyalkylation these same physical changes tend to take place in reverse. If one starts with a solid resin, oxyalkylation tends to make it tacky or semi-resinous and further oxyalkylation makes the tackiness disappear and changes the product to a liquid. Thus, as the resin is oxyalkylated it decreases in viscosity, that is, becomes more liquid or changes from a solid to a liquid, particularly when it is converted to the water-dispersible or water-soluble stage. The color of the oxyalkylated derivative is usually considerably lighter than the original product from which it is made, varying from a pale straw color to an amber or reddish amber. The viscosity usually varies from that of an oil, like castor oil, to that of a thick viscous sirup. Some products are waxy. The presence of a solvent, such as 15% xylene or the like, thins the viscosity considerably and also reduces the color in dilution. No undue significance need be attached to the color for the reason that if the same compound is prepared in glass and in iron, the latter usually has somewhat darker color. If the resins are prepared as customarily employed in varnish resin manufacture, i. e., a procedure that excludes the presence of oxygen during the resinification and subsequent cooling of the resin, then of course the initial resin is much lighter in color. We have employed some resins which initially are almost water-white and also yield a lighter colored final product.

Actually, in considering the ratio of alkylene oxide to add, and we have previously pointed out that this can be predetermined using laboratory tests, it is our actual preference from a practical standpoint to make tests on a small pilot plant scale. Our reason for so doing is that we make one run, and only one, and that we have a complete series which shows the progressive effect of introducing the oxyalkylating agent, for instance, the ethyleneoxy radicals. Our preferred procedure is as follows: We prepare a suitable resin, or for that matter, purchase it in the open market. We employ 8 pounds of resin and 4 pounds of xylene and place the resin and xylene in a suitable autoclave with an open reflux condenser. We prefer to heat and stir until the solution is complete. We have pointed out that soft resins which are fluid or semi-fluid can be readily prepared in various ways, such as the use of ortho-tertiary amylphenol, ortho-hydroxydiphenyl, ortho-decylphenol, or by the use of higher molecular weight aldehydes than formaldehyde. If such resins are used, a solvent need not be added but may be added as a matter of convenience or for comparison, if desired. We then add a catalyst, for instance, 2% of caustic soda, in the form of a 20% to 30% solution, and remove the water of solution or formation. We then shut off the reflux condenser and use the equipment as an autoclave only, and oxyethylate until a total of 60 pounds of ethylene oxide have been added, equivalent to 750% of the original resin. We prefer a temperature of about 150° C. to 175° C. We also take samples at intermediate points as indicated in the following table:

| Percentages | Pounds of Ethylene Oxide Added per 8-pound Batch |
| --- | --- |
| 50 | 4.0 |
| 66⅔ | 5.33 |
| 75 | 6.0 |
| 100 | 8.0 |
| 150 | 12.0 |
| 200 | 16.0 |
| 300 | 24.0 |
| 400 | 32.0 |
| 500 | 40.0 |
| 600 | 48.0 |
| 750 | 60.0 |

Oxyethylation to 750% can usually be completed within 30 hours and frequently more quickly.

The samples taken are rather small, for instance, 2 to 4 ounces, so that no correction need be made in regard to the residual reaction mass. Each sample is divided in two. One-half the sample is placed in an evaporating dish on the steam bath overnight so as to eliminate the xylene. Then 1.5% solutions are prepared from both series of samples, i. e., the series with xylene present and the series with xylene removed.

Mere visual examination of any samples in solution may be sufficient to indicate hydrophile character or surface activity, i. e., the product is soluble, forming a colloidal sol, or the aqueous solution foams or shows emulsifying property. All these properties are related through adsorption at the interface, for example, a gas-liquid interface or a liquid-liquid interface. If desired, surface activity can be measured in any one of the usual ways using a Du Nouy tensiometer or dropping pipette, or any other procedure for measuring interfacial tension. Such tests are conventional and require no further description. Any compound having sub-surface-activity, and all derived from the same resin and oxyalkylated to a greater extent, i. e., those having a greater proportion of alkylene oxide, are useful for the practice of this invention.

Another reason why we prefer to use a pilot plant test of the kind above described is that we can use the same procedure to evaluate tolerance towards a trifunctional phenol such as hydroxybenzene or metacresol satisfactorily. Previous reference has been made to the fact that one can conduct a laboratory scale test which will indicate whether or not a resin, although soluble in solvent, will yield an insoluble rubbery product, i. e., a product which is neither hydrophile nor surface-active, upon oxyethylation, particularly extensive oxyethylation. It is also obvious that one may have a solvent-soluble resin derived from a mixture of phenols having present 1% or 2% of a trifunctional phenol which will result in an insoluble rubber at the ultimate stages of oxyethylation but not in the earlier stages. In other words, with resins from some such phenols, addition of 2 or 3 moles of the oxyalkylating agent per phenolic nucleus, particularly ethylene oxide, gives a surface-active product which is perfectly satisfactory, while more extensive oxyethylation yields an insoluble rubber, that is, an unsuitable product. It is obvious that this present procedure of evaluating trifunctional phenol tolerance is more suitable than the previous procedure.

It may be well to call attention to one result which may be noted in a long drawn-out oxyalkylation, particularly oxyethylation, which would not appear in a normally conducted reaction. Reference has been made to cross-linking and its effect on solubility and also the fact that, if carried far enough, it causes incipient stringiness, then pronounced stringiness, usually followed by a semi-rubbery or rubbery stage. Incipient stringiness, or even pronounced stringiness, or even the tendency toward a rubbery stage, is not objectionable so long as the final product is still hydrophile and at least sub-surface-active. Such material frequently is best mixed with a polar solvent, such as alcohol or the like, and preferably an alcoholic solution is used. The point which we want to make here, however, is this: Stringiness or rubberization at this stage may possibly be the result of etherification. Obviously if a difunctional phenol and an aldehyde produce a non-cross-linked resin molecule and if such molecule is oxyalkylated so as to introduce a plurality of hydroxyl groups in each molecule, then and in that event if subsequent etherification takes place, one is going to obtain cross-linking in the same general way that one would obtain cross-linking in other resinification reactions. Ordinarily there is little or no tendency toward etherification during the oxyalkylation step. If it does take place at all, it is only to an insignificant and undetectable degree. However, suppose that a certain weight of resin is treated with an equal weight of, or twice its weight of, ethylene oxide. This may be done in a comparatively short time, for instance, at 150° or 175° C. in 4 to 8 hours, or even less. On the other hand, if in an exploratory reaction, such as the kind previously described, the ethylene oxide were added extremely slowly in order to take stepwise samples, so that the reaction required 4 or 5 times as long to introduce an equal amount of ethylene oxide employing the same temperature, then etherification might cause stringiness or a suggestion of rubberiness. For this reason if in an exploratory experiment of the kind previously described there appears to be any stringiness or rubberiness, it may be well to repeat the experiment and reach the intermediate stage of oxyalkylation as rapidly as possible and then proceed slowly beyond this intermediate stage. The entire purpose of this modified procedure is to cut down the time of reaction so as to avoid etherification if it be caused by the extended time period.

It may be well to note one peculiar reaction sometimes noted in the course of oxyalkylation, particularly oxyethylation, of the thermoplastic resins herein described. This effect is noted in a case where a thermoplastic resin has been oxyalkylated, for instance, oxyethylated, until it gives a perfectly clear solution, even in the presence of some accompanying water-insoluble solvent such as 10% to 15% of xylene. Further oxyalkylation, particularly oxyethylation, may then yield a product which, instead of giving a clear solution as previously, gives a very milky solution suggesting that some marked change has taken place. One explanation of the above change is that the structural unit indicated in the following way where $8_n$ is a fairly large number, for instance, 10 to 20, decomposes and an oxyalkylated resin representing a lower degree of oxyethylation and a less soluble one, is generated and a cyclic polymer of ethylene oxide is produced, indicated thus:

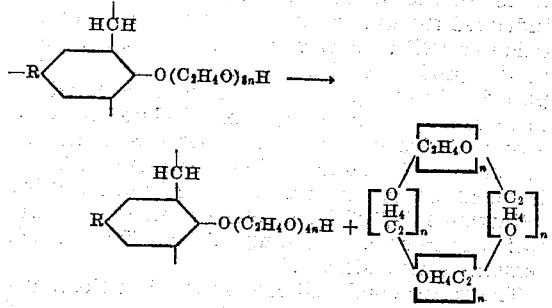

This fact, of course, presents no difficulty for the reason that oxyalkylation can be conducted in each instance stepwise, or at a gradual rate, and samples taken at short intervals so as to arrive at a point where optimum surface activity or hydrophile character is obtained if desired; for products for use in the practice of this invention, this is not necessary and, in fact, may be undesirable, i. e., reduce the efficiency of the product.

We do not known to what extent oxyalkylation produces uniform distribution in regard to phenolic hydroxyls present in the resin molecule. In some instances, of course, such distribution can not be uniform for the reason that we have not specified that the molecules of ethylene oxide, for example, be added in multiples of the units present in the resin molecule. This may be illustrated in the following manner:

Suppose the resin happens to have five phenolic nuclei. If a minimum of two moles of ethylene oxide per phenolic nucleus are added, this would mean an addition of 10 moles of ethylene oxide, but suppose that one added 11 moles of ethylene oxide, or 12, or 13, or 14 moles; obviously, even assuming the most uniform distribution possible, some of the polyethyleneoxy radicals would contain 3 ethyleneoxy units and some would contain 2. Therefore, it is impossible to specify uniform distribution in regard to the entrance of the ethylene oxide or other oxyalkylating agent. For that matter, if one were to introduce 25 moles of ethylene oxide there is no way to be certain that all chains would have 5 units; there might be some having, for example, 4 and 6 units, or for that matter 3 or 7 units. Nor is there any basis for assuming that the number of molecules of the oxyalkylating agent added to each of the molecules of the resin is the same, or different. Thus, where formulae are given to illustrate or depict the oxyalkylated products, distributions of radicals indicated are to be statistically taken. We have, however, included specific directions and specifications in regard to the total amount of ethylene oxide, or total amount of any other oxyalkylating agent, to add.

In regard to solubility of the resins and the oxyalkylated compounds, and for that matter derivatives of the latter, the following should be noted. In oxyalkylation, any solvent employed should be non-reactive to the alkylene oxide employed. This limitation does not apply to solvents used in cryoscopic determinations for obvious reasons. Attention is directed to the fact that various organic solvents may be employed to verify that the resin is organic solvent-soluble. Such solubility test merely characterizes the resin. The particular solvent used in such test may not be suitable for a molecular weight determination and, likewise, the solvent used in determining molecular weight may not be suitable as a solvent during oxyalkylation. For solution of the oxyalkylated compounds, or their derivatives a great variety of solvents may be employed, such as alcohols, ether alcohols, cresols, phenols, ketones, esters, etc., alone or with the addition of water. Some of these are mentioned hereafter. We prefer the use of benzene or diphenylamine as a solvent in making cryoscopic measurements. The most satisfactory resins are those which are soluble in xylene or the like, rather than those which are soluble only in some other solvent containing elements other than carbon and hydrogen, for instance, oxygen or chlorine. Such solvents are usually polar, semi-polar, or slightly polar in nature compared with xylene, cymene, etc.

Reference to cryoscopic measurement is concerned with the use of benzene or other suitable compound as a solvent. Such method will show that conventional resins obtained, for example, from para-tertiary amylphenol and formaldehyde in presence of an acid catalyst, will have a molecular weight indicating 3, 4, 5 or somewhat greater number of structural units per molecule. If more drastic conditions of resinification are employed or if such low-stage resin is subjected to a vacuum distillation treatment as previously described, one obtains a resin of a distinctly higher molecular weight. Any molecular weight determination used, whether cryoscopic measurement or otherwise, other than the cinventional cryoscopic one employing benzene, should be checked so as to insure that it gives consistent values on such conventional resins as a control. Frequently all that is necessary to make an approximation of the molecular weight range is to make a comparison with the dimer obtained by chemical combination of two moles of the same phenol, and one mole of the same aldehyde under conditions to insure dimerization. As to the preparation of such dimers from substituted phenols, see Carswell, "Phenoplasts," page 31. The increased viscosity, resinous character, and decreased solubility, etc., of the higher polymers in comparison with the dimer, frequently are all that is required to establish that the resin contains 3 or more structural units per molecule.

Ordinarily, the oxyalkylation is carried out in autoclaves provided with agitators or stirring devices. We have found that the speed of the agitation markedly influences the time reaction. In some cases, the change from slow speed agitation, for example, in a laboratory autoclave agitation with a stirrer operating at a speed of 60 to 200 R. P. M., to high speed agitation, with the stirrer operating at 250 to 350 R. P. M., reduces the time required for oxyalkylation by about one-half to two-thirds. Frequently xylene-soluble products which give insoluble products by procedures employing comparatively slow speed agitation, give suitable hydrophile products when produced by similar procedure but with high speed agitation, as a result, we believe, of the reduction in the time required with consequent elimination or curtailment of opportunity for curing or etherization. Even if the formation of an insoluble product is not involved, it is frequently advantageous to speed up the reaction, thereby reducing production time, by increasing agitating speed. In large scale operations, we have demonstrated that economical manufacturing results from continuous oxyalkylation, that is, an operation in which the alkylene oxide is continuously fed to the reaction vessel, with high speed agitation, i. e., an agitator operating at 250 to 350 R. P. M. Continuous oxyalkylation, other conditions being the same, is more rapid than batch oxyalkylation, but the latter is ordinarily more convenient for laboratory operation.

Previous reference has been made to the fact that in preparing esters or compounds of the kind herein described, particularly adapted for demulsification of water-in-oil emulsions, and for that matter for other purposes, one should make a complete exploration of the wide variation in hydrophobe-hydrophile balance as previously referred to. It has been stated, furthermore, that this hydrophobe-hydrophile balance of the oxyalkylated resins is imparted, as far as the range of variation goes, to a greater or lesser extent to the herein decribed derivatives. This means that one employing the present invention should take the choice of the most suitable derivative selected from a number of representative compounds, thus, not only should a variety of resins be prepared exhibiting a variety of oxyalkylations, particularly oxyethylations, but also a variety of derivatives. This can be done conveniently in light of what has been said previously. From a practical standpoint, using pilot plant equipment, for instance, an autoclave having a capacity of approximately three to five gallons. We have made a single run by appropriate selections in which the molal ratio of resin equivalent to ethylene oxide is one to one, 1 to 5, 1 to 10, 1 to 15, and 1 to 20. Furthermore, in making these particular runs we have used continuous addition of ethylene oxide. In the continuous addition of ethylene oxide we have employed either a cylinder of ethylene oxide without added nitrogen, provided that the pressure of the ethylene oxide was sufficiently great to pass into the autoclave, or also we have used an arrangement which, in essence, was the equivalent of an ethylene oxide cylinder with a means for injecting nitrogen so as to force out the ethylene oxide in the manner of an ordinary Seltzer bottle, combined with the means for either weighting the cylinder or measuring the ethylene oxide used volumetrically. Such procedure and arrangement for injecting liquids is, of course, conventional. The following data sheets exemplify such operations, i. e., the combination of both continuous agitation and taking samples so as to give five different variants in oxyethylation. In adding ethylene oxide continuously, there is one precaution which must be taken at all times. The addition of ethylene oxide must stop immediately if there is any indication that reaction is stopped or, obviously, if reaction is not started at the beginning of the reaction period. Since the addition of ethylene oxide is invariably an exothermic reaction, whether or not reaction has taken place can be judged in the usual manner by observing (a) temperature rise or drop, if any, (b) amount of cooling water or other means required to dissipate heat of reaction; thus, if there is a temperature drop without the use of cooling water or equivalent, or if there is no rise in temperature without using cooling water control, careful investigation should be made.

In the tables immediately following we are showing the maximum temperature and usually the operating temperature. In other words, by experience we have found that if the initial reactants are raised to the indicated temperature and then if ethylene oxide is added slowly, this temperature is maintained by cooling water until the oxyethylation is complete. We have also indicated the maximum pressure that we obtained or the pressure range. Likewise, we have indicated the time required to inject the ethylene oxide as well as a brief note as to the solubility of the product at the end of the oxyethylation period. As one period ends it will be noted we have removed part of the oxyethylated mass to give us derivatives, as therein described; the rest has been subjected to further treatment. All this is apparent by examining the columns headed "Starting mix," "Mix at end of reaction," "Mix which is removed for sample," and "Mix which remains as next starter."

The resins employed are prepared in the manner described in Examples 1a through 103a of our said Patent 2,499,370, except that instead of being prepared on a laboratory scale they were prepared in 10 to 15-gallon electro-vapor heated synthetic resin pilot plant reactors, as manufactured by the Blaw-Knox Company, Pittsburgh, Pennsylvania, and completely described in their Bulletin No. 2087 issued in 1947, with specific reference to Specification No. 71-3965.

For convenience, the following tables give the numbers of the examples of our said Patent 2,499,370 in which the preparation of identical resins on laboratory scale are described. It is understood that in the following examples, the change is one with respect to the size of the operation.

The solvent used in each instance was xylene. This solvent is particularly satisfactory for the reason that it can be removed readily by distillation or vacuum distillation. In these continuous experiments the speed of the stirrer in the autoclave was 250 R. P. M.

In examining the subsequent tables it will be noted that if a comparatively small sample is taken at each stage, for instance, ½ to one gallon, one can proceed through the entire molal stage of 1 to 1, to 1 to 20, without remaking at any intermediate stage. This is illustrated by Example 104a. In other examples we found it desirable to take a larger sample, for instance, a 3-gallon sample, at an intermediate stage. As a result it was necessary in such instances to start with a new resin sample in order to prepare sufficient oxyethylated derivatives illustrating the latter stages. Under such circumstances, of course, the earlier stages which had been previously prepared were by-passed or ignored. This is illustrated in the tables where, obviously, it shows that the starting mix was not removed from a previous sample.

Phenol for resin: Para-tertiary amylphenol    Aldehyde for resin: Formaldehyde

[Resin made in pilot plant size batch, approximately 25 pounds, corresponding to 3a of Patent 2,499,370 but this batch designated 104a.]

| | Starting Mix | | | Mix at End of Reaction | | | Mix Which is Removed for Sample | | | Mix Which Remains as Next Starter | | | Max. Pressure, lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1 Ex. No. 104b | 14.25 | 15.75 | 0 | 14.25 | 15.75 | 4.0 | 3.35 | 3.65 | 1.0 | 10.9 | 12.1 | 3.0 | 80 | 150 | ¼ | I |
| *Second Stage* | | | | | | | | | | | | | | | | |
| Resin to EtO Molal Ratio 1:5 Ex. No. 105b | 10.9 | 12.1 | 3.0 | 10.9 | 12.1 | 15.25 | 3.77 | 4.17 | 5.31 | 7.13 | 7.93 | 9.94 | 70 | 158 | ½ | ST |
| *Third Stage* | | | | | | | | | | | | | | | | |
| Resin to EtO Molal Ratio 1:10 Ex. No. 106b | 7.13 | 7.93 | 9.94 | 7.13 | 7.93 | 19.69 | 3.29 | 3.68 | 9.04 | 3.84 | 4.25 | 10.65 | 60 | 173 | ½ | FS |
| *Fourth Stage* | | | | | | | | | | | | | | | | |
| Resin to EtO Molal Ratio 1:15 Ex. No. 107b | 3.84 | 4.25 | 10.65 | 3.84 | 4.25 | 16.15 | 2.04 | 2.21 | 8.55 | 1.80 | 2.04 | 7.60 | 220 | 160 | ½ | RS |
| *Fifth Stage* | | | | | | | | | | | | | | | | |
| Resin to EtO Molal Ratio 1:20 Ex. No. 108b | 1.80 | 2.04 | 7.60 | 1.80 | 2.04 | 10.2 | | | | | | | 100 | 150 | ¼ | QS |

I=Insoluble.   ST=Slight tendency toward becoming soluble.   FS=Fairly soluble.   RS=Readily soluble.   QS=Quite soluble.

Phenol for resin: Nonylphenol    Aldehyde for resin: Formaldehyde

[Resin made in pilot plant size batch, approximately 25 pounds, corresponding to 7oa of Patent 2,499,370 but this batch designated 109a.]

| | Starting Mix | | | Mix at End of Reaction | | | Mix Which is Removed for Sample | | | Mix Which Remains as Next Starter | | | Max. Pressure, lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1 Ex. No. 109b | 15.0 | 15.0 | 0 | 15.0 | 15.0 | 3 | 5.0 | 5.0 | 1.0 | 10.0 | 10.0 | 2.0 | 50 | 150 | 1¼ | ST |
| *Second Stage* | | | | | | | | | | | | | | | | |
| Resin to EtO Molal Ratio 1:5 Ex. No. 110b | 10 | 10 | 2.0 | 10 | 10 | 9.4 | 2.72 | 2.72 | 2.56 | 7.27 | 7.27 | 6.86 | 100 | 147 | 2 | DT |
| *Third Stage* | | | | | | | | | | | | | | | | |
| Resin to EtO Molal Ratio 1:10 Ex. No. 111b | 7.27 | 7.27 | 6.86 | 7.27 | 7.27 | 13.7 | 4.16 | 4.16 | 7.68 | 3.15 | 3.15 | 5.95 | 125 | 155 | 1¼ | S |
| *Fourth Stage* | | | | | | | | | | | | | | | | |
| Resin to EtO Molal Ratio 1:15 Ex. No. 112b | 3.15 | 3.15 | 5.95 | 3.15 | 3.15 | 8.95 | 1.05 | 1.05 | 2.95 | 2.10 | 2.10 | 6.00 | 220 | 174 | 2¼ | S |
| *Fifth Stage* | | | | | | | | | | | | | | | | |
| Resin to EtO Molal Ratio 1:20 Ex. No. 113b | 2.10 | 2.10 | 6.00 | 2.10 | 2.10 | 8.00 | | | | | | | 220 | 183 | ¾ | VS |

S=Soluble.   ST=Slight tendency toward solubility.   DT=Definite tendency toward solubility.   VS=Very soluble.

Phenol for resin: *Para-octylphenol*    Aldehyde for resin: *Formaldehyde*

[Resin made in pilot plant size batch, approximately 25 pounds, corresponding to 8a of Patent 2,499,370 but this batch designated 114a.]

| | Starting Mix | | | Mix at End of Reaction | | | Mix Which is Removed for Sample | | | Mix Which Remains as Next Starter | | | Max. Pressure, lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* Resin to EtO Molal Ratio 1:1 Ex. No. 114b | 14.2 | 15.8 | 0 | 14.2 | 15.8 | 3.25 | 3.1 | 3.4 | 0.75 | 11.1 | 12.4 | 2.5 | 50 | 150 | 1½ | NS |
| *Second Stage* Resin to EtO Molal Ratio 1:5 Ex. No. 115b | 11.1 | 12.4 | 2.5 | 11.1 | 12.4 | 12.5 | 7.0 | 7.82 | 7.88 | 4.1 | 4.58 | 4.62 | 100 | 171 | ½ | SS |
| *Third Stage* Resin to EtO Molal Ratio 1:10 Ex. No. 116b | 6.64 | 7.36 | 0 | 6.64 | 7.36 | 15.0 | | | | | | | 120 | 190 | 1¼ | S |
| *Fourth Stage* Resin to EtO Molal Ratio 1:15 Ex. No. 117b | 4.40 | 4.9 | 0 | 4.4 | 4.9 | 14.8 | | | | | | | 400 | 160 | ½ | VS |
| *Fifth Stage* Resin to EtO Molal Ratio 1:20 Ex. No. 118b | 4.1 | 4.58 | 4.6 | 4.1 | 4.58 | 18.52 | | | | | | | 250 | 172 | ¼ | VS |

S=Soluble. NS=Not soluble. SS=Somewhat soluble. VS=Very soluble.

Phenol for resin: *Menthylphenol*    Aldehyde for resin: *Formaldehyde*

Date

[Resin made in pilot plant size batch, approximately 25 pounds, corresponding to 69a of Patent 2,499,370 but this batch designated 119a.]

| | Starting Mix | | | Mix at End of Reaction | | | Mix Which is Removed for Sample | | | Mix Which Remains as Next Starter | | | Max. Pressure, lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* Resin to EtO Molal Ratio 1:1 Ex. No. 119b | 13.65 | 16.35 | 0 | 13.65 | 16.35 | 3.0 | 9.55 | 11.45 | 2.1 | 4.1 | 4.9 | 0.9 | 60 | 150 | 1¼ | NS |
| *Second Stage* Resin to EtO Molal Ratio 1:5 Ex. No. 120b | 10 | 12 | 0 | 10 | 12 | 10.75 | 4.52 | 5.42 | 4.81 | 5.48 | 6.58 | 5.94 | 140 | 160 | 1½ | S |
| *Third Stage* Resin to EtO Molal Ratio 1:10 Ex. No. 121b | 5.48 | 6.58 | 5.94 | 5.48 | 6.58 | 10.85 | | | | | | | 90 | 160 | ¼ | S |
| *Fourth Stage* Resin to EtO Molal Ratio 1:15 Ex. No. 122b | 4.1 | 4.9 | 0.9 | 4.1 | 4.9 | 13.15 | | | | | | | 180 | 171 | 1½ | VS |
| *Fifth Stage* Resin to EtO Molal Ratio 1:20 Ex. No. 123b | 3.10 | 3.72 | 0.68 | 3.10 | 3.72 | 13.43 | | | | | | | 320 | 170 | ¾ | VS |

S=Soluble. NS=Not soluble. VS=Very soluble.

*Phenol for resin: Para-secondary butylphenol*    *Aldehyde for resin: Formaldehyde*

[Resin made in pilot plant size batch, approximately 25 pounds, corresponding to 2a of Patent 2,499,370 but this batch designated 124a.]

|  | Starting Mix | | | Mix at End of Reaction | | | Mix Which is Removed for Sample | | | Mix Which Remains as Next Starter | | | Max. Pressure, lbs. sq. in. | Max. Temperature, °C. | Time, hrs. | Solubility |
|---|---|---|---|---|---|---|---|---|---|---|---|---|---|---|---|---|
|  | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO |  |  |  |  |
| *First Stage* |  |  |  |  |  |  |  |  |  |  |  |  |  |  |  |  |
| Resin to EtO Molal Ratio 1:1 Ex. No. 124b | 14.45 | 15.55 | 0 | 14.45 | 15.55 | 4.25 | 5.97 | 6.38 | 1.75 | 8.48 | 9.17 | 2.50 | 60 | 150 | 5/12 | NS |
| *Second Stage* |  |  |  |  |  |  |  |  |  |  |  |  |  |  |  |  |
| Resin to EtO Molal Ratio 1:5 Ex. No. 125b | 8.48 | 9.17 | 2.50 | 8.48 | 9.17 | 16.0 | 5.83 | 6.32 | 11.05 | 2.65 | 2.85 | 4.95 | 95 | 188 | 1/3 | SS |
| *Third Stage* |  |  |  |  |  |  |  |  |  |  |  |  |  |  |  |  |
| Resin to EtO Molal Ratio 1:10 Ex. No. 126b | 4.82 | 5.18 | 0 | 4.82 | 5.18 | 14.25 |  |  |  |  |  |  | 400 | 183 | 1/2 | S |
| *Fourth Stage* |  |  |  |  |  |  |  |  |  |  |  |  |  |  |  |  |
| Resin to EtO Molal Ratio 1:15 Ex. No. 127b | 3.85 | 4.15 | 0 | 3.85 | 4.15 | 17.0 |  |  |  |  |  |  | 120 | 180 | 2/3 | VS |
| *Fifth Stage* |  |  |  |  |  |  |  |  |  |  |  |  |  |  |  |  |
| Resin to EtO Molal Ratio 1:20 Ex. No. 128b | 2.65 | 2.85 | 4.95 | 2.65 | 2.85 | 15.45 |  |  |  |  |  |  | 80 | 170 | 5/12 | VS |

S=Soluble.   NS=Not soluble.   SS=Somewhat soluble.   VS=Very soluble.

*Phenol for resin: Menthyl*    *Aldehyde for resin: Propionaldehyde*

[Resin made on pilot plant size batch, approximately 25 pounds, corresponding to 81a of Patent 2,499,370 but this batch designated 129a.]

|  | Starting Mix | | | Mix at End of Reaction | | | Mix Which is Removed for Sample | | | Mix Which Remains as Next Starter | | | Max. Pressure, lbs. sq. in. | Max. Temperature, °C. | Time, hrs. | Solubility |
|---|---|---|---|---|---|---|---|---|---|---|---|---|---|---|---|---|
|  | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO |  |  |  |  |
| *First Stage* |  |  |  |  |  |  |  |  |  |  |  |  |  |  |  |  |
| Resin to EtO Molal Ratio 1:1 Ex. No. 129b | 12.8 | 17.2 |  | 12.8 | 17.2 | 2.75 | 4.25 | 5.7 | 0.95 | 8.55 | 11.50 | 1.80 | 110 | 150 | 1/6 | Not soluble. |
| *Second Stage* |  |  |  |  |  |  |  |  |  |  |  |  |  |  |  |  |
| Resin to EtO Molal Ratio 1:5 Ex. No. 130b | 8.55 | 11.50 | 1.80 | 8.55 | 11.50 | 9.3 | 4.78 | 6.42 | 5.2 | 3.77 | 5.08 | 4.10 | 100 | 170 | 1/6 | Somewhat soluble. |
| *Third Stage* |  |  |  |  |  |  |  |  |  |  |  |  |  |  |  |  |
| Resin to EtO Molal Ratio 1:10 Ex. No. 131b | 3.77 | 5.08 | 4.10 | 3.77 | 5.08 | 13.1 |  |  |  |  |  |  | 100 | 182 | 1/12 | Soluble. |
| *Fourth Stage* |  |  |  |  |  |  |  |  |  |  |  |  |  |  |  |  |
| Resin to EtO Molal Ratio 1:15 Ex. No. 132b | 5.2 | 7.0 |  | 5.2 | 7.0 | 17.0 |  |  |  | 2.10 | 2.83 | 6.87 | 200 | 182 | 1/4 | Very soluble. |
| *Fifth Stage* |  |  |  |  |  |  |  |  |  |  |  |  |  |  |  |  |
| Resin to EtO Molal Ratio 1:20 Ex. No. 133b | 2.10 | 2.83 | 6.87 | 2.10 | 2.83 | 9.12 |  |  |  |  |  |  | 90 | 150 | 1/6 | Do. |

*Phenol for resin: Para-tertiary amylphenol*   *Aldehyde for resin: Furfural*

[Resin made on pilot plant size batch, approximately 25 pounds, corresponding to 42a of Patent 2,499,370 but this batch designated as 134a.]

| | Starting Mix | | | Mix at End of Reaction | | | Mix Which is Removed for Sample | | | Mix Which Remains as Next Starter | | | Max. Pressure, lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* Resin to EtO Molal Ratio 1:1 Ex. No. 134b | 11.2 | 18.0 | ------ | 11.2 | 18.0 | 3.5 | 2.75 | 4.4 | 0.85 | 8.45 | 13.6 | 2.65 | 120 | 135 | ⅓ | Not soluble. |
| *Second Stage* Resin to EtO Molal Ratio 1:5 Ex. No. 135b | 8.45 | 13.6 | 2.65 | 8.45 | 13.6 | 12.65 | 5.03 | 8.12 | 7.55 | 3.42 | 5.48 | 5.10 | 110 | 150 | ¼ | Somewhat soluble. |
| *Third Stage* Resin to EtO Molal Ratio 1:10 Ex. No. 136b | 4.5 | 8.0 | ------ | 4.5 | 8.0 | 14.5 | 2.45 | 5.35 | 7.99 | 2.05 | 3.65 | 6.60 | 180 | 163 | ¼ | Soluble. |
| *Fourth Stage* Resin to EtO Molal Ratio 1:15 Ex. No. 137b | 3.42 | 5.48 | 5.10 | 3.42 | 5.48 | 15.10 | ------ | ------ | ------ | ------ | ------ | ------ | 180 | 188 | ¼ | Very soluble. |
| *Fifth Stage* Resin to EtO Molal Ratio 1:20 Ex. No. 138b | 2.05 | 3.65 | 6.60 | 2.05 | 3.65 | 13.35 | ------ | ------ | ------ | ------ | ------ | ------ | 120 | 125 | ⅓ | Do. |

*Phenol for resin: Menthyl*   *Aldehyde for resin: Furfural*

[Resin made on pilot size batch, approximately 25 pounds, corresponding to 89a of Patent 2,499,370 but this batch designated as 139a.]

| | Starting Mix | | | Mix at End of Reaction | | | Mix Which is Removed for Sample | | | Mix Which Remain as Next Starter | | | Max. Pressure, lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* Resin to EtO Molal Ratio 1:1 Ex. No. 139b | 10.25 | 17.75 | ------ | 10.25 | 17.75 | 2.5 | 2.65 | 4.60 | 0.65 | 7.6 | 13.15 | 1.85 | 90 | 150 | ⅙ | Not soluble. |
| *Second Stage* Resin to EtO Molal Ratio 1:5 Ex. No. 140b | 7.6 | 13.15 | 1.85 | 7.6 | 13.15 | 9.35 | 5.2 | 9.00 | 6.40 | 2.4 | 4.15 | 2.95 | 80 | 177 | ⅙ | Somewhat soluble. |
| *Third Stage* Resin to EtO Molal Ratio 1:10 Ex. No. 141b | 4.22 | 6.98 | ------ | 4.22 | 6.98 | 10.0 | ------ | ------ | ------ | ------ | ------ | ------ | 90 | 165 | ½ | Soluble. |
| *Fourth Stage* Resin to EtO Molal Ratio 1:15 Ex. No. 142b | 3.76 | 6.24 | ------ | 3.76 | 6.24 | 13.25 | ------ | ------ | ------ | ------ | ------ | ------ | 100 | 171 | ½ | Very soluble. |
| *Fifth Stage* Resin to EtO Molal Ratio 1:20 Ex. No. 143b | 2.4 | 4.15 | 2.95 | 2.4 | 4.15 | 11.70 | ------ | ------ | ------ | ------ | ------ | ------ | 90 | 150 | ¼ | Do. |

*Phenol for resin: Para-octyl*      *Aldehyde for resin: Furfural*

[Resin made on pilot plant size batch, approximately 25 pounds, corresponding to 42a of Patent 2,499,370 with 206 parts by weight of commercial para-octylphenol replacing 164 parts by weight of para-tertiary amylphenol but this batch designated as 144a.]

| | Starting Mix | | | Mix at End of Reaction | | | Mix Which is Removed for Sample | | | Mix Which Remains as Next Starter | | | Max. Pressure, lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* Resin to EtO Molal Ratio 1:1 Ex. No. 144b | 12.1 | 18.6 | ------ | 12.1 | 18.6 | 3.0 | 5.38 | 8.28 | 1.34 | 6.72 | 10.32 | 1.66 | 80 | 150 | ½ | Insoluble. |
| *Second Stage* Resin to EtO Molal Ratio 1:5 Ex. No. 145b | 9.25 | 14.25 | ------ | 9.25 | 14.25 | 11.0 | 3.73 | 5.73 | 4.44 | 5.52 | 8.52 | 6.56 | 100 | 177 | ⁵⁄₁₂ | Slight tendency toward becoming soluble. |
| *Third Stage* Resin to EtO Molal Ratio 1:10 Ex. No. 146b | 6.72 | 10.32 | 1.66 | 6.72 | 10.32 | 14.91 | 4.97 | 7.62 | 11.01 | 1.75 | 2.70 | 3.90 | 85 | 182 | ¼ | Fairly soluble. |
| *Fourth Stage* Resin to EtO Molal Ratio 1:15 Ex. No. 147b | 5.52 | 8.52 | 6.56 | 5.52 | 8.52 | 19.81 | | | | | | | 100 | 176 | ½ | Readily soluble. |
| *Fifth Stage* Resin to EtO Molal Ratio 1:20 Ex. No. 148b | 1.75 | 2.70 | 3.90 | 1.75 | 2.70 | 8.4 | | | | | | | 80 | 160 | ¼ | Quite soluble. |

*Phenol for resin: Para-phenyl*      *Aldehyde for resin: Furfural*

[Resin made on pilot plant size batch, approximately 25 pounds, corresponding to 42a of Patent 2,499,370 with 170 parts by weight of commercial paraphenylphenol replacing 164 parts by weight of para-tertiary amylphenol but this batch designated as 149a.]

| | Starting Mix | | | Mix at End of Reaction | | | Mix Which is Removed for Sample | | | Mix Which Remains as Next Starter | | | Max. Pressure, lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* Resin to EtO Molal Ratio 1:1 Ex. No. 149b | 13.9 | 16.7 | ------ | 13.9 | 16.7 | 3.0 | 3.50 | 4.25 | 0.80 | 10.35 | 12.45 | 2.20 | 100 | 160 | ½ | Insoluble. |
| *Second Stage* Resin to EtO Molal Ratio 1:5 Ex. No. 150b | 10.35 | 12.45 | 2.20 | 10.35 | 12.45 | 12.20 | 5.15 | 6.19 | 6.06 | 5.20 | 6.26 | 6.14 | 80 | 183 | ⅓ | Slight tendency toward solubility. |
| *Third Stage* Resin to EtO Molal Ratio 1:10 Ex. No. 151b | 8.90 | 10.7 | ------ | 8.90 | 10.70 | 19.0 | 5.30 | 6.38 | 11.32 | 3.60 | 4.32 | 7.68 | 90 | 193 | ⁷⁄₁₂ | Fairly soluble. |
| *Fourth Stage* Resin to EtO Molal Ratio 1:15 Ex. No. 152b | 5.20 | 6.26 | 6.14 | 5.20 | 6.26 | 16.64 | | | | | | | 100 | 171 | ⅙ | Readily soluble. |
| *Fifth Stage* Resin to EtO Molal Ratio 1:20 Ex. No. 153b | 3.60 | 4.32 | 7.68 | 3.60 | 4.32 | 15.68 | Sample somewhat rubbery and gelatinous but fairly soluble | | | | | | 230 | 170 | 2 | |

*Phenol for resin: Para-nonylphenol*     *Aldehyde for resin: Furfural*

[Resin made on pilot plant size batch, approximately 25 pounds, corresponding to 88a of Patent 2,499,370 but this batch designated as 154a.]

| | Starting Mix | | | Mix at End of Reaction | | | Mix Which is Removed for Sample | | | Mix Which Remains as Next Starter | | | Max. Pressure, lbs. sq. in. | Max. Temperature, ° C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1 Ex. No. 154b | 10.85 | 20.75 | ------ | 10.85 | 20.75 | 3.0 | 2.57 | 4.90 | 0.73 | 8.28 | 15.85 | 2.27 | 100 | 150 | ½ | Insoluble. |
| *Second Stage* | | | | | | | | | | | | | | | | |
| Resin to EtO Molal Ratio 1:5 Ex. No. 155b | 8.28 | 15.85 | 2.27 | 8.28 | 15.85 | 11.77 | 3.82 | 7.33 | 5.45 | 4.46 | 8.52 | 6.32 | 100 | 182 | ⅙ | Slight tendency toward becoming soluble. |
| *Third Stage* | | | | | | | | | | | | | | | | |
| Resin to EtO Molal Ratio 1:10 Ex. No. 156b | 5.95 | 11.35 | ------ | 5.95 | 11.35 | 16.75 | 3.38 | 6.42 | 9.50 | 2.57 | 4.93 | 7.25 | 100 | 181 | ½ | Fairly soluble. |
| *Fourth Stage* | | | | | | | | | | | | | | | | |
| Resin to EtO Molal Ratio 1:15 Ex. No. 157b | 4.46 | 8.52 | 6.32 | 4.46 | 8.52 | 19.07 | ------ | ------ | ------ | ------ | ------ | ------ | 90 | 188 | ⅙ | Readily soluble. |
| *Fifth Stage* | | | | | | | | | | | | | | | | |
| Resin to EtO Molal Ratio 1:20 Ex. No. 158b | 2.57 | 4.93 | 7.25 | 2.57 | 4.93 | 14.50 | ------ | ------ | ------ | ------ | ------ | ------ | 100 | 160 | ¼ | Quite soluble. |

*Phenol for resin: Para-phenylphenol*     *Aldehyde for resin: Formaldehyde*

[Resin made on pilot plant size batch, approximately 25 pounds, corresponding to 9a of Patent 2,499,370 but this batch designated as 159a.]

| | Starting Mix | | | Mix at End of Reaction | | | Mix Which is Removed for Sample | | | Mix Which Remains as Next Starter | | | Max. Pressure, lbs. sq. in. | Max. Temperature, ° C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1 Ex. No. | ------ | ------ | ------ | ------ | ------ | ------ | ------ | ------ | ------ | ------ | ------ | ------ | ------ | ------ | ------ | ------ |
| *Second Stage* | | | | | | | | | | | | | | | | |
| Resin to EtO Molal Ratio 1:5 Ex. No. 159b | 11.0 | 9.0 | ------ | 11.0 | 9.0 | 11.75 | 7.6 | 6.2 | 8.11 | 3.41 | 2.80 | 3.64 | 160 | 188 | ¼ | Insoluble. |
| *Third Stage* | | | | | | | | | | | | | | | | |
| Resin to EtO Molal Ratio 1:10 Ex. No. | ------ | ------ | ------ | ------ | ------ | ------ | ------ | ------ | ------ | ------ | ------ | ------ | ------ | ------ | ------ | ------ |
| *Fourth Stage* | | | | | | | | | | | | | | | | |
| Resin to EtO Molal Ratio 1:15 Ex. No. | ------ | ------ | ------ | ------ | ------ | ------ | ------ | ------ | ------ | ------ | ------ | ------ | ------ | ------ | ------ | ------ |
| *Fifth Stage* | | | | | | | | | | | | | | | | |
| Resin to EtO Molal Ratio 1:20 Ex. No. 160b | 3.41 | 2.80 | 3.64 | 3.41 | 2.80 | 13.64 | ------ | ------ | ------ | ------ | ------ | ------ | 80 | 170 | ¼ | Soluble. |

*Phenol for resin: Para-secondarybutylphenol*   *Aldehyde for resin: Furfural*

[Resin made on pilot plant size batch, approximately 25 pounds, corresponding to 42a of Patent 2,499,370 with 150 parts by weight of commercial para-secondary butylphenol replacing 164 parts by weight of para-tertiary amylphenol but this batch designated as 161a.]

| | Starting Mix | | | Mix at End of Reaction | | | Mix Which is Removed for Sample | | | Mix Which Remains as Next Starter | | | Max. Pressure, lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1 Ex. No. 161b | 12.0 | 17.9 | ------ | 12.0 | 17.9 | 3.5 | 2.65 | 3.98 | 0.77 | 9.35 | 13.92 | 2.73 | 150 | 171 | 1/6 | Insoluble. |
| *Second Stage* | | | | | | | | | | | | | | | | |
| Resin to EtO Molal Ratio 1:5 Ex. No. 162b | 9.35 | 13.92 | 2.73 | 9.35 | 13.92 | 13.23 | 5.00 | 7.42 | 7.08 | 4.35 | 6.50 | 6.15 | 100 | 192 | 1/3 | Slight tendency toward becoming soluble. |
| *Third Stage* | | | | | | | | | | | | | | | | |
| Resin to EtO Molal Ratio 1:10 Ex. No. 163b | 6.25 | 8.95 | ------ | 6.25 | 8.95 | 17.0 | 3.23 | 4.61 | 8.76 | 3.02 | 4.34 | 8.24 | 120 | 188 | 5/12 | Fairly soluble. |
| *Fourth Stage* | | | | | | | | | | | | | | | | |
| Resin to EtO Molal Ratio 1:15 Ex. No. 164b | 4.35 | 6.50 | 6.15 | 4.35 | 6.50 | 18.40 | ------ | ------ | ------ | ------ | ------ | ------ | 100 | 181 | 1/3 | Readily soluble. |
| *Fifth Stage* | | | | | | | | | | | | | | | | |
| Resin to EtO Molal Ratio 1:20 Ex. No. 165b | 3.02 | 4.34 | 8.24 | 3.02 | 4.34 | 16.49 | Sample somewhat rubbery and gelatinous but shows limited water solubility. | | | | | | 120 | 161 | 3/4 | -------------- |

*Phenol for resin: Para-octylphenol*   *Aldehyde for resin: Propionaldehyde*

[Resin made on pilot plant size batch, approximately 25 pounds, corresponding to 34a of Patent 2,499,370 with 206 parts by weight of commercial para-octylphenol replacing 164 parts by weight of para-tertiary amylphenol but this batch designated as 166a.]

| | Starting Mix | | | Mix at End of Reaction | | | Mix Which is Removed for Sample | | | Mix Which Remains as Next Starter | | | Max. Pressure, lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1 Ex. No. 166b | 13.3 | 16.9 | ------ | 13.3 | 16.9 | 3.0 | 3.1 | 4.0 | 0.70 | 10.2 | 12.9 | 2.3 | 100 | 150 | 1/3 | Insoluble. |
| *Second Stage* | | | | | | | | | | | | | | | | |
| Resin to EtO Molal Ratio 1:5 Ex. No. 167b | 10.2 | 12.9 | 2.3 | 10.2 | 12.9 | 11.3 | 6.34 | 8.03 | 7.03 | 3.86 | 4.87 | 4.27 | 100 | 166 | 1/4 | Becoming soluble. |
| *Third Stage* | | | | | | | | | | | | | | | | |
| Resin to EtO Molal Ratio 1:11.3 Ex. No. 168b | 6.46 | 8.24 | ------ | 6.46 | 8.24 | 16.5 | 3.52 | 4.49 | 8.99 | 2.94 | 3.75 | 7.51 | 80 | 177 | 1/4 | Fairly soluble. |
| *Fourth Stage* | | | | | | | | | | | | | | | | |
| Resin to EtO Molal Ratio 1:15 Ex. No. 169b | 3.86 | 4.87 | 4.27 | 3.86 | 4.87 | 13.02 | ------ | ------ | ------ | ------ | ------ | ------ | 80 | 204 | 1/4 | Readily soluble. |
| *Fifth Stage* | | | | | | | | | | | | | | | | |
| Resin to EtO Molal Ratio 1:20 Ex. No. 170b | 2.94 | 3.75 | 7.51 | 2.94 | 3.75 | 13.26 | ------ | ------ | ------ | ------ | ------ | ------ | 100 | 150 | 1/4 | Soluble. |

*Phenol for resin: Para-nonylphenol*    *Aldehyde for resin: Propionaldehyde*

[Resin made on pilot plant size batch, approximately 25 pounds, corresponding to 82a of Patent 2,499,370 but this batch designated as 171a.]

| | Starting Mix | | | Mix at End of Reaction | | | Mix Which is Removed for Sample | | | Mix Which Remains as Next Starter | | | Max. Pressure, lbs. sq. in. | Max. Temperature, ° C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* Resin to EtO Molal Ratio 1:1 Ex. No. 171b | 10.9 | 18.0 | ------ | 10.9 | 18.0 | 3.0 | 2.65 | 4.4 | 0.75 | 8.25 | 13.60 | 2.25 | 120 | 150 | 1/12 | Insoluble. |
| *Second Stage* Resin to EtO Molal Ratio 1:5 Ex. No. 172b | 8.25 | 13.60 | 2.25 | 8.25 | 13.60 | 11.50 | 5.10 | 8.35 | 7.05 | 3.15 | 5.25 | 4.45 | 95 | 174 | 1/6 | Becoming soluble. |
| *Third Stage* Resin to EtO Molal Ratio 1:10 Ex. No. 173b | 5.65 | 9.35 | ------ | 5.65 | 9.35 | 15.75 | 3.71 | 6.14 | 10.35 | 1.94 | 3.21 | 5.40 | 90 | 182 | 5/12 | Fairly soluble. |
| *Fourth Stage* Resin to EtO Molal Ratio 1:15 Ex. No. 174b | 3.15 | 5.25 | 4.45 | 3.15 | 5.25 | 13.45 | ------ | ------ | ------ | ------ | ------ | ------ | 85 | 182 | 1/6 | Readily soluble. |
| *Fifth Stage* Resin to EtO Molal Ratio 1:20 Ex. No. 175b | 1.94 | 3.21 | 5.40 | 1.94 | 3.21 | 10.65 | ------ | ------ | ------ | ------ | ------ | ------ | 90 | 150 | 1/6 | Soluble. |

*Phenol for resin: Para-tertiary amylphenol*    *Aldehyde for resin: Propionaldehyde*

[Resin made on pilot plant size batch, approximately 25 pounds, corresponding to 34a of Patent 2,499,370 but this batch designated as 176a.]

| | Starting Mix | | | Mix at End of Reaction | | | Mix Which is Removed for Sample | | | Mix Which Remains as Next Starter | | | Max. Pressure, lbs. sq. in. | Max. Temperature, ° C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* Resin to EtO Molal Ratio 1:1 Ex. No. 176b | 12.6 | 16.2 | ------ | 12.6 | 16.2 | 3.5 | 3.08 | 3.96 | 0.86 | 9.52 | 12.24 | 2.64 | 105 | 150 | 1/12 | Insoluble. |
| *Second Stage* Resin to EtO Molal Ratio 1:5 Ex. No. 177b | 9.52 | 12.24 | 2.64 | 9.52 | 12.24 | 12.89 | 5.27 | 6.79 | 7.14 | 4.25 | 5.45 | 5.75 | 85 | 171 | 1/6 | Becoming soluble. |
| *Third Stage* Resin to EtO Molal Ratio 1:10 Ex. No. 178b | 6.5 | 8.3 | ------ | 6.5 | 8.3 | 17.75 | 3.81 | 4.87 | 10.42 | 2.69 | 3.43 | 7.33 | 120 | 183 | 1/6 | Fairly soluble. |
| *Fourth Stage* Resin to EtO Molal Ratio 1:15 Ex. No. 179b | 4.25 | 5.45 | 5.75 | 4.25 | 5.45 | 17.25 | ------ | ------ | ------ | ------ | ------ | ------ | 85 | 196 | 1/6 | Readily soluble. |
| *Fifth Stage* Resin to EtO Molal Ratio 1:20 Ex. No. 180b | 2.69 | 3.43 | 7.33 | 2.69 | 3.43 | 14.55 | ------ | ------ | ------ | ------ | ------ | ------ | 95 | 160 | 1/6 | Soluble. |

PART 3

As previously pointed out, having obtained the oxyalkylated derivatives of the kind described, the next step contemplates reacting such derivatives with chemical compounds or mixtures in which the detergent-forming acid and the polycarboxy-forming acid are already present in the form of resulting acids.

Although one may use a tricarboxy acid such as tricarballylic acid or citric acid, our preference is to employ a dicarboxy acid or acid anhydride such as oxalic acid, maleic acid, tartaric acid, citraconic acid, phthalic acid, adipic acid, succinic acid, azelaic acid, sebacic acid, adduct acids obtained by reaction between maleic anhydride, citraconic anhydride, and butadiene, diglycollic acid or cyclopentadiene. Oxalic acid is not quite as satisfactory as some of the other acids due to its ease of decomposition. In light of raw material costs it is our preference to use phthalic anhydride, maleic anhydride, citraconic anhydride, diglycollic acid, adipic acid, and certain other acids in the same price range which are both cheap and heat-resistant. One may also use adduct acids of the diene or Clocker type having more than 10 carbon atoms, but those reactants having 10 carbon atoms or less are definitely preferred.

It is well known that certain monocarboxy organic acids containing 8 carbon atoms or more, and not more than 32 carbon atoms, are characterized by the fact that they combine with alkalies to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids. For instance, instead of fatty acids, one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids; and, of course, this is also true in regard to derivatives of the kind indicated, insofar that such derivatives are obtained from higher fatty acids. The petroleum acids include not only naturally-occurring naphthenic acids but also acids obtained by the oxidation of wax, paraffin, etc. Such acids may have as many as 32 carbon atoms. For instance, see U. S. Patent No. 2,242,837 dated May 20, 1941, to Shields.

The monocarboxy detergent-forming esters of the oxyalkylated derivatives herein described are preferably derived from unsaturated fatty acids having 18 carbon atoms. Such unsaturated fatty acids include oleic acid, ricinoleic acid, linoleic acid, linolenic acid, etc. One may employ mixed fatty acids as, for example, the fatty acids obtained from hydrolysis of cottonseed oil, soyabean oil, etc. It is our ultimate preference that the esters of the kind herein contemplated be derived from unsaturated fatty acids, and more especially, unsaturated fatty acids containing a hydroxyl radical, or unsaturated fatty acids which have been subjected to oxidation. In addition to synthetic carboxy acids obtained by the oxidation or paraffins or the like, there is the somewhat analogous class obtained by treating carbon dioxide or carbon monoxide, in the presence of hydrogen or an olefin, with steam, or by causing a halogenated hydrocarbon to react with potassium cyanide and saponifying the product obtained. Such products or mixtures thereof, having at least 8 and not more than 32 carbon atoms and having at least one carboxyl group or the equivalent thereof, are suitable as detergent-forming monocarboxy acids; and another analogous class actually suitable is the mixture of carboxylic acids obtained by the alkali treatment of alcohols of high molecular weight formed in the catalytic hydrogenation of carbon monoxide.

As is well known, one need not use a high molal carboxy acid, such as a fatty acid, for introduction of the acyl group or acyloxy group. Any suitable functional equivalent such as the acyl halide, the anhydride, ester, amide, etc., may be employed.

Such polycarboxy reactants and such detergent-forming monocarboxy acids alone or in combination with an appropriate alcohol radical which may be monohydric or polyhydric, have been combined to give suitable reactants for combination with the polyhydroxylated compounds previously described. A particularly suitable type of polycarboxy detergent-forming compound is described in U. S. Patent No. 2,343,434, dated March 7, 1944, to Wells and De Groote, and is the identical type herein contemplated, except that in the instant case the detergent-forming acid is limited to those having 32 carbon atoms instead of 38 carbon atoms. Thus, the reactant employed for combination with the oxyalkylated resin in the words of the aforementioned U. S. Patent No. 2,343,434 is as follows: "... an ester containing (a) a polyhydric alcohol radical, (b) a polybasic carboxylic acid radical, and (c) an acyloxy radical containing 8 to 38 carbon atoms derived from a detergent-forming monocarboxy acid having 8 to 38 carbon atoms, at least one polyhydric alcohol radical being ester-linked with a group containing said acyloxy radical and the number of said groups ester-linked with at least one polyhydric alcohol radical." It is to be noted that such reactant is acidic in nature, due to the presence of a free carboxyl radical, and thus capable of reacting with the hydroxylated oxyalkylated reactant.

In order to avoid repetition, reference is made to said aforementioned U. S. Patent No. 2,343,434, as to the manufacture of the acidic polycarboxy detergent-forming compound, as if the same text appeared herein. For convenience of comparison the same examples are herein included:

*Example 1c*

Mix 296 pounds of phthalic anhydride with 92 pounds of glycerol, and heat for approximately 5 to 10 minutes at approximately 125° to 150° C., until a thin, clear, water-white liquid resin intermediate, containing no unreacted phthalic anhydride, has been produced. The resin intermediate is then mixed with 312 pounds of castor oil and the mixture is heated to from 150° to 250° C. for approximately 10 to 30 minutes, after which it is permitted to cool and is diluted with from 10% to 50% of denatured alcohol.

In the above reaction the phthalic anhydride, two moles, is united with glycerol, one mole, so as to give a product which corresponds in chemical constants to glycerol diacid phthalate. This product is then reacted with castor oil, mole for mole, so that one mole of water is eliminated and the final product represents approximately one free carboxyl per unit, or approximately one carboxyl, based on a molecular weight of 1300 or acid value 43.

Example 2c

Maleic anhydride is substituted for phthalic anhydride in Example 1c, preceding.

Example 3c

Adipic acid is substituted for phthalic anhydride in Example 1c, preceding.

Example 4c

Succinic acid or anhydride is substituted for phthalic anhydride in Example 1c, preceding.

Example 5c

One-pound mole of mannitan mono-ricinoleate is esterified with three pound moles of phthalic anhydride so as to produce the acid tribasic fractional ester.

Example 6c

Sorbitan mono-ricinoleate is substituted for mannitan ricinoleate in the preceding example.

Example 7c

Mannitan mono-oleate or sorbitan mono-oleate is substituted for the corresponding ricinoleate in the preceding Examples 5c and 6c, and the proportion of dibasic acid or anhydride is reduced, so that the ratio is 2½ pound moles of the dibasic acid or anhydride for each pound mole of the oleate.

The products of the esterification reaction produced according to Examples 1c to 7c, are viscous, yellowish, oily materials resembling somewhat blown castor oil in consistency. They are only slightly soluble in either water or in paraffin base mineral oil (not more than 1 part to 1,000) but go into solution with lower alcohols (methyl to octyl) to form clear solutions. The solutions may be made up in equal parts, for example.

It is to be noted that the products so produced or any other typical reactants of the same type, are acidic in nature. In all instances, all the products described in U. S. Patent No. 2,343,434, have an acid value, for instance, of at least 5 to 10 as a minimum, but with 40 to 100 as an average value.

Having obtained the oxyalkylated derivative in the acidic polycarboxy reactant above described, it is only necessary to mix the two reactants in a predetermined proportion and then cause esterification to take place. Needless to say, esterification may also be accompanied by rearrangement or cross-esterification to some degree. Generally speaking, if the two reactants are mixed and heated at a temperature above the boiling point of water, and below the pyrolytic point, esterification takes place easily and readily. For example, a temperature of 120° to 200° C. may be employed. If need be, a temperature as high as 250° C. can be employed provided it is short of the pyrolytic point. If desired, the reaction can be hastened by the addition of a suitable catalyst, such as paratoluene sulfonic acid. The amount added may be in the neighborhood of one-half of 1%. The reaction can also be hastened by passing dried hydrochloric acid gas through the reaction mixture. The reaction is also hastened by passing any dried inert gas through the mixture, for instance, dried $CO_2$ or dried nitrogen gas.

One of the easiest and simplest ways of handling the reaction is to conduct the esterification in the presence of an inert water-insoluble solvent, such as benzene, toluene, xylene, cymene, decalin, etc. Our preference is to use xylene or cymene, for the reason that the reflux temperature is usually more than sufficient and is high enough to expedite the elimination of water. The vapors are led to the conventional condenser with the reflux trap which diverts the water and returns the solvent. These details will be amplified somewhat in succeeding examples.

Example 1d

An oxyalkylated thermoplastic phenol-aldehyde resin such as Example 126b, preceding, was employed as a reactant. The hydroxyl value of the oxyalkylated derivative could be calculated without determination, based on the hydroxyl value and weight of the phenol-aldehyde resin originally employed, plus the increase in weight after oxyalkylation. If glycide or methylglycide were employed, allowance would have to be made for the polyhydric character of the oxyalkylating agent. In any event, if desired, the hydroxyl value of the oxyalkylated derivative could be determined by the Verley-Bölsing method or by any other acceptable procedure. Similarly, the acid value of the acidic reactant was determined by the usual volumetric titration procedure. Our preferred acidic reactant was the one described under the heading of Example 1c. Our preference was to titrate the product to determine its acid value. Based on the known hydroxyl value of the oxyalkylated derivative and the acid value of the polycarboxy reactant, it was our preference to combine such reactants in various proportions so as to add enough of the polycarboxy reactant to combine with ¼, ½ or ¾, or all the theoretical hydroxyl of the oxyalkylated derivative. As an example, the average hydroxyl value for the hydroxylated derivative exemplified by Example 126b, was 105. An average acid value for the acidic reactant exemplified by Example 1c, was 43.0. Stated another way, this would mean that the average molecular equivalent of the oxyalkylated derivative was 535, and of the acidic derivative, 1300.0. In other words, ignoring the hydroxyl value of the acidic derivative, if it has any hydroxyl value, means that in following the proportions above suggested, we prefer to react 1070 pounds of the oxyalkylated derivative with 650, 1300, 1950 and 2600 pounds of the acidic reactant, as previously indicated, which will combine with ¼, ½, ¾ and all the equivalent hydroxyl, respectively.

The esterification was conducted in any conventional manner, such as merely mixing the reactants alone or in the presence of a solvent of sufficiently high boiling point so as to insure reaction. The solvent used could be xylene, cymene, decalin, etc. Since an acidic reactant was employed (one having a free carboxyl radical), water was formed. It was convenient sometimes to use a solvent as described in connection with a conventional water trap which separated the water and removed it from the reaction zone but returned the excess of solvent.

Although esterification can be conducted in absence of a solvent, we prefer to employ a solvent, one reason being that esterification is best conducted in a homogeneous system and thus, if there is any question of solubility between the reactants, there is apt to be an increase in solubility by addition of a suitably selected solvent. It was not necessary to add all the acid reactant at one time. One could add ¼ or ½ the total amount to be esterified, and after such portion of the reactant was combined, then one could add more of the acid or anhydride. The solubility of the acid reactant, of course, increased as the hydroxyl radical was replaced by an ester radical.

Our preference was to have present a substantial amount of xylene or water; boiling solvent and to distill under a reflux condenser arrangement, so that the water resulting from the esterification was condensed and volatilized along with the xylene vapor in a suitably arranged trap. The amount of xylene employed was approximately equal to one-half the weight of the mixed reactants. Such water could be removed from the trap, either manually or automatically, and the xylene returned continuously for further distillation. It was rarely necessary to catalyze reactions of this kind by the addition of an acid, but if desired, a small amount of dry hydrochloric acid could be injected continuously into the esterification mixture. Small amounts of conventional sulfonic acids, such as toluene sulfonic acid, can be added as catalyst, if required. Such additions are rarely necessary, and in any event, 1% or even as little as .2% may be ample. One advantage of using a trap in such reactions where water is evolved, is that the amount of water condensed may serve as an excellent index as to the reaction rate. The completeness of reaction can be determined readily by merely titrating the reaction mass.

As a further example of the same reaction conducted on a laboratory scale with conventional laboratory glassware with condenser, phase-separating trap, stirrer, etc., the following was used. 1070 grams of the oxyalkylated xylene-containing resin identified as 126b, were reacted with 650 grams of the acidic product identified as 1c. To the mixture there was added also 250 grams of added xylene and 15 grams of para-toluene sulfonic acid. The mixture was refluxed at 147 degrees C. for approximately 5 hours. During this time 9.5 grams of water distilled off.

*Example 2d*

The same procedure was followed as in Example 1d, preceding, but instead of using an oxyalkylated thermoplastic phenol-aldehyde resin, such as exemplified by Example 126b, or resins obtained from phenols having 8 carbon atoms or less in the substituent group, there were employed instead various other oxyalkylated thermoplastic phenol-aldehyde resins, such as those exemplified by 139b to 143b, or other similar derivatives obtained from phenols having more than 8 carbon atoms in the substituent radical. As a specific example 900 grams of a xylene-containing oxyalkylated resin 121b were mixed with 800 grams of the acidic reactant identified as 1c, along with 250 grams of added xylene and 20 grams of paratoluene sulfonic acid. The mixture was refluxed for 4¾ hours. At the end of this time, 17.5 grams of water had been evolved.

*Example 3d*

The same procedure was employed as in Examples 1d and 2d, immediately preceding, except that instead of employing the acidic reactant identified as 1c, there was employed instead the acidic reagent of the kind exemplified by Examples 2c to 5c. As a specific example, 1000 grams of xylene-containing oxyethylated resin identified as 122b were reacted with 500 grams of the acidic reagent identified as 2c. 250 grams of added xylene and 20 grams of para-toluene sulfonic acid were included in the mixture. The reactants were refluxed for approximately 6 hours until slightly over 10 grams of water had been driven off.

Additional examples are shown in the following table. The first column gives the example number; the second column gives the identification of the oxyalkylated resin; the third column gives the weight of the resin taken; the fourth column gives the identification of the acidic reactant; the fifth column gives the weight of the acidic reactant employed; the sixth column gives the time of the reflux period; the seventh column gives the reflux temperature; the eighth column indicates the amount of xylene that was added; and the last column indicates the amount of water off. The amount of para-toluene sulfonic acid is not indicated but was 20 grams in each experiment.

| Ex. No. | Xyl-Containing Oxy. Resin No. | Weight employed | Acidic Reactant Ex. No. | Weight of Acidic Reactant | Time, Hrs. after reaching Max. Temp. | Max. Temp. of Reaction | Xylene Added | Water Off |
|---|---|---|---|---|---|---|---|---|
| | | Grams | | Grams | | °C. | Grams | Grams |
| 4c | 116b | 800 | 3c | 200 | 3 | 148 | 200 | 6.0 |
| 5c | 107b | 900 | 4c | 250 | 3¾ | 147 | 200 | 8.1 |
| 6c | 112b | 600 | 5c | 300 | 5 | 144 | 300 | 17.5 |
| 7c | 150b | 700 | 7c | 600 | 4½ | 148 | 200 | 5.9 |

In connection with the aforementioned U. S. Patent No. 2,343,434, attention is directed to what is said in regard to suitable reactants for producing such compounds therein contemplated. Said patent states that in producing the compounds the polybasic carboxy acids, which may be employed in the esterification reaction, may be exemplified by phthalic, succinic, maleic, fumaric, citric, citraconic, maleic, adipic, tartaric, oxalic, or the like. The anhydrides of such polybasic carboxy acids such as phathalic anyhydride, maleic anhydride, etc., are the equivalents of the acids, and in some respects are even more advantageous than the acids in the production of esters. When reference is made to polybasic carboxy acids, then anhydrides thereof are also included. Other suitable polybasic acids may be prepared by the diene synthesis which involves condensation of alpha-beta unsaturated acids or anhydrides with compounds containing a conjugated double bond. For example, the condensation of maleic anhydride with alpha terpinene, yields a dicarboxy acid which is suitable. Other polybasic carboxy acids may be prepared similarly by the diene synthesis involving condensation of an alpha-beta unsaturated monocarboxy acid with a carboxy acid containing a conjugated double bond. For example, crotonic acid may be condensed with abietic acid which contains a conjugated double bond to yield a dicarboxy acid.

Similarly, in regard to the detergent-forming monocarboxy acids subject to the previous limitation that 32 carbon atoms represent the upper limit, there is found to be substantially the following subject-matter: Detergent-forming monobasic carboxy acids are those acids having at least 8 carbon atoms which have the capacity to react with alkali to form soap or soap-like products, and are exemplified by fatty acids containing 8 to 32 carbon atoms, such as oleic, linoleic, ricinoleic, stearic, hydrostearic, palmitic, linolenic, eruci, clupanodonic, myristic, etc., and fatty acids of the character referred to are normally regarded as preferable. The term "detergent-forming carboxy acids" includes naphthenic acids. Naphthenic acids are derived from various petroleums, or are obtained by treatments which involve oxidation of hydrocarbon bodies present in the naturally-occurring crude oils. The number of carbon atoms in naturally-occurring naphthenic acids may vary from 10 carbon atoms to 38 carbon atoms. Naphthenic acid, or admixtures, of the type available on the open market, and which preferably have a saponification value in the neighborhood of about 250, are suitable. Naphthenic acids of the kind referred to are readily esterified with glycerine to form naphthenin on intimate admixture and agitation in the presence of dried hydrochloric acid gas, using a procedure that is substantially the same as that generally used in the formation of stearin from stearic acid and glycol. It is known that such naphthenic acids can be treated, for example, with halogens so as to produce derivatives such as chloronaphthenic acids. Also included among the detergent-forming acids are those monocarboxy acids sometimes called wax acids or paraffin acids, which are formed as a result of oxidation of paraffin or petroleum waxes, particularly those derived from paraffin base hydrocarbons and which include hydroxylated, as well as non-hydroxylated, acids. Acids occurring in certain waxes such as carnaubic acid, cerotic acid, lanopalmic acid and lanoceric acid, are considered detergent-forming monocarboxy acids. Rosin and resinic acids such as abietic acid are likewise included. Such acid materials, due to the fact that they react with alkalies to form soap or soap-like products, are commonly called detergent-forming acids.

The terms "hydroxylated detergent-forming acids" or "hydroxy detergent-forming acids" refer to those detergent-forming acids which contain in the acyl radical thereof a hydroxyl or the equivalent. The most common types of hydroxylated detergent-forming carboxy acids are hydoxylated fatty acids containing 8 to 32 carbon atoms, such as ricinoleic acid, mono- and dihydroxystearic acid, trihydroxy palmitic acid, etc. In addition, hydroxylated detergent-forming acids such as hydroxylated wax acids, may be used.

A wide variety of hydroxylated fatty acids can be obtained by the hydroxylation of fatty material with hydrogen peroxide. See J. A. C. S., volume 67, 1786 (1945). The method here described contemplates the treatment of mono-unsaturated fatty acids with hydrogen peroxide. The same procedure can be applied to unsaturated fatty materials, such as marine oils, in such manner as to convert all or part of the ethylene linkages into hydroxyl radicals. Thus, there is available a wide variety of fatty materials which are completely saturated and hydroxylated, or partially unsaturated and hydroxylated, and which can be converted into the corresponding fatty acids, methyl or ethyl esters. As an example, one may treat sardine oil with hydrogen peroxide and obtain an unsaturated hydroxylated product having the following constants:

Acid value _____ 19.1
Saponification value _____ 222.5
Hydroxyl value _____ 171.1
Iodine value _____ 86.2

As stated in the aforementioned patent, U. S. No. 2,343,434, a wide variety of polyhydric alcohols may be used, both the ether and non-ether types. Glycerol is the most common example. The patent refers specifically to ethylene glycol, alpha-beta gamma butane triol, beta methyl glycol, triethylene glycol, 1,3-propane diol, isobutylene glycol, ethylene glycol, glycerol ether, mannitol, sorbitol, sorbitol monobutyl ether, erythritol, adonitol, mannitan, sorbitan, etc.

As previously pointed out, the resins prior to oxyalkylation vary from thick viscous liquids, sometimes tacky liquids, to solids. Oxyalkylation, particularly oxyethylation, tends to reduce this viscosity and also to lighten the color somewhat from a black, deep amber, yellow or almost water-white, to thin liquids in which the tackiness is reduced, and to yield liquids rather than solids. As stated before, the color becomes lighter and the water solubility or dispersibility of the oxyalkylated derivatives may vary as has been specified previously in detail. Esterification with the acidic reagent described under the heading, Example 1c, and subsequent thereto, tends to reduce the viscosity or stickiness of the oxyethylated derivatives, although in a few instances there is no change in viscosity or stickiness or even a definite increase.

There is generally no change in color except the darkening, particularly if unsaturated fatty acids are used, and also there may be a darkening due to the color contributed by the paratoluene sulfonic acid, or a similar catalyst. Invariably the water solubility or dispersibility is apt to be reduced in the formation of the ester. The final product can be neutralized with ammonia, an amine, or any other similar base to neutralize simply the sulfonic acid acidity due to the catalyst or, if there is any residual carboxylic acidity, it can be disposed of in the same way, or can be disposed of by esterification with a monohydric alcohol, such as anhydrous ethyl or methyl alcohol. Any residual carboxyl radicals, of course, can be esterified further with some other acid, such as acetic acid or the like. As far as the commercial product is concerned for various purposes and particularly for demulsification, there is no need to modify or change the products described above and, similarly, there is no need to eliminate the solvent by vacuum distillation or any other means. The products are entirely satisfactory for use just as obtained above.

If desired, the color of the final product can be reduced greatly by any conventional procedure, such as bleaching with various decolorizing agents or charcoal. In this manner the color can be readily reduced to amber, pale yellow, or almost water-white. However, for ordinary application in the various arts there is no advantage and the added expense is prohibitive for most industrial purposes.

One rather peculiar property is the fact that where some of the oxyalkylated resins show moderate or limited solubility in water prior to esterification, particularly in the manner last indicated, they sometimes seem to show even greater solubility in water, after such esterification process, notwithstanding the fact that apparently a large hydrophobe radical is introduced and, in essence, the repetitious alkylene oxide linkage apparently must solubilize both hydrophobe radicals, i. e., the one derived from the resin and the one derived from the detergent-forming monocarboxy acid.

Previous reference has been made to the solubility or surface-activity of the oxyalkylated resins themselves. Needless to say, as they are converted into esters of the kind herein described the tendency is almost invariably to decrease solubility in water although for some strange reason exceptional cases appear. It is, of course, to be noted that as one produces partial esters particularly, or for that matter complete esters, the more highly oxyalkylated derivatives show the same range in solubility as has been described in connection with the oxyalkylated resins prior to esterification.

We claim:

1. The resultant of the esterification reaction involving on the one hand an acidic ester containing: (a) a polyhydric alcohol radical having not more than 6 carbon atoms and composed of hydrogen, carbon and oxygen; (b) a polybasic carboxylic acid radical having not more than 10 carbon atoms; and (c) an acyloxy radical containing 8 to 32 carbon atoms derived from a detergent-forming monocarboxy acid having 8 to 32 carbon atoms, said radicals being joined by ester linkages, at least one polyhydric alcohol radical being ester-linked with a group containing said acyloxy radical and the number of said groups ester-linked with at least one polyhydric alcohol radical being less than the valency of said polyhydric alcohol radical, and on the other hand certain hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent - soluble, water-insoluble phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than two; said phenol being of the formula

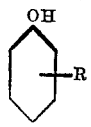

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

2. The resultant of the esterification reaction involving on the one hand an acidic ester containing: (a) a polyhydric alcohol radical having not more than 6 carbon atoms and composed of hydrogen, carbon and oxygen; (b) a polybasic carboxylic acid radical having not more than 10 carbons atoms; and (c) an acyloxy radical containing 8 to 32 carbon atoms derived from a detergent-forming monocarboxy acid having 8 to 32 carbon atoms, said radicals being joined by ester linkages, at least one polyhydric alcohol radical being ester-linked with a group containing said acyloxy radical and the number of said groups ester-linked with at least one polyhydric alcohol radical being less than the valency of said polyhydric alcohol radical; and on the other hand certain hydrophile synthetic products; said hydrophile synthetic products being oxyethylation products of (A) ethylene oxide, and (B) an oxyethylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than two; said phenol being of the formula

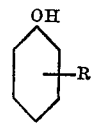

in which R is a hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said ester, as well as said oxyethylated resin, in an equal weight of xylene are sufficient to produce an emulsion when said xylene solution is shaken vigorously with one to three volumes of water.

3. The resultant of the esterification reaction involving on the one hand an acidic ester containing: (a) a polyhydric alcohol radical having not more than 6 carbon atoms and composed of hydrogen, carbon and oxygen; (b) a polybasic carboxylic acid radical having not more than 10 carbon atoms; and (c) an acyloxy radical containing 8 to 32 carbon atoms derived from a detergent-forming monocarboxy acid having 8 to 32 carbon atoms, said radicals being joined by ester linkages, at least one polyhydric alcohol radical being ester-linked with a group containing said acyloxy radical and the number of said groups ester-linked with at least one polyhydric alcohol radical being less than the valency of said polyhydric alcohol radical, and on the other hand certain hydrophile synthetic products; said hydrophile synthetic products being oxyethylation products of (A) ethylene oxide; and (B) an oxyethylation-susceptible, fusible, organic solvent-soluble, water-insoluble, low-stage phenol-formaldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of phenols of functionality greater than two; said phenol being of the formula

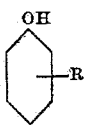

in which R is an aliphatic hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $(C_2H_4O)_n$, wherein $n$ is a numeral varying from 1 to 20; with the proviso that at least 2 moles of ethylene oxide be introduced for each phenolic nucleus; and with the final proviso that the hydrophile properties of said ester, as well as said oxyethylated resin, in an equal weight of xylene are sufficient to produce an emulsion when said xylene solution is shaken vigorously with one to three volumes of water.

4. The product of claim 3 wherein R is substituted in the para position.

5. The product of claim 3 wherein R is a butyl radical substituted in the para position.

6. The product of claim 3 wherein R is an amyl radical substituted in the para position.

7. The product of claim 3 wherein R is a nonyl radical substituted in the para position.

MELVIN DE GROOTE.
BERNHARD KEISER.

REFERENCES CITED

The following references are of record in the file of this patent:

UNITED STATES PATENTS

| Number | Name | Date |
|---|---|---|
| 2,268,947 | Krumbhaar | Jan. 6, 1942 |
| 2,499,365 | De Groote | Mar. 7, 1950 |